US 8,253,844 B2

(12) United States Patent
Neidrich

(10) Patent No.: US 8,253,844 B2
(45) Date of Patent: *Aug. 28, 2012

(54) SYSTEM AND METHOD FOR VARYING EXPOSURE TIME FOR DIFFERENT PARTS OF A FIELD OF VIEW WHILE ACQUIRING AN IMAGE

(75) Inventor: Jason Michael Neidrich, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 205 days.

This patent is subject to a terminal disclaimer.

(21) Appl. No.: 12/852,738

(22) Filed: Aug. 9, 2010

(65) Prior Publication Data

US 2010/0295984 A1 Nov. 25, 2010

Related U.S. Application Data

(62) Division of application No. 11/556,720, filed on Nov. 6, 2006, now Pat. No. 7,782,389, which is a division of application No. 10/035,868, filed on Dec. 31, 2001, now Pat. No. 7,158,180.

(51) Int. Cl.
*H04N 5/225* (2006.01)
*H04N 7/00* (2011.01)
(52) U.S. Cl. ............... 348/340; 348/39; 348/37; 348/36
(58) Field of Classification Search .................. 348/340, 348/36, 37, 39
See application file for complete search history.

(56) References Cited

U.S. PATENT DOCUMENTS

| | | | |
|---|---|---|---|
| 5,202,785 | A | 4/1993 | Nelson |
| 5,212,555 | A | 5/1993 | Stoltz |
| 5,212,582 | A | 5/1993 | Nelson |
| 5,285,407 | A | 2/1994 | Gale et al. |
| 5,654,549 | A | 8/1997 | Landecker et al. |
| 5,797,050 | A | 8/1998 | Smith |
| 5,943,157 | A | 8/1999 | Florence et al. |
| 5,953,153 | A | 9/1999 | Conner et al. |
| 6,220,730 | B1 | 4/2001 | Hewlett et al. |

(Continued)

OTHER PUBLICATIONS

Beisker, W., et al., "Design and application of a fast computerized CCD camera system for recording of astronomical events"; http://www.iota-es.de/ioc/ioc-sys.htm.

(Continued)

*Primary Examiner* — Hung Lam
(74) *Attorney, Agent, or Firm* — Charles A. Brill; Wade J. Brady, III; Frederick J. Telecky, Jr.

(57) ABSTRACT

A system and method for exposing different parts of a single field of view for various and differing lengths of time while capturing an image is provided. For astrophotography, unwanted light pollution or over-saturation bleeding from nearby or obtrusive stars may be greatly reduced or eliminated while still capturing the image of the nearby brighter star in the same field of view. Also, a system and method for real-time contrast control while capturing an image to optimize signal-to-noise ratio for various parts of the captured image, is provided. An embodiment of the present invention provides such techniques by using spatial light modulator devices, such as a digital micro-mirror device, to controllably mask different portions of light from an image that expose film or a charge-coupled device. A system and method for a way to use a spatial light modulator device as an active and controllable mask for photolithography, is provided.

29 Claims, 16 Drawing Sheets

U.S. PATENT DOCUMENTS

| | | | |
|---|---|---|---|
| 6,525,863 | B1 | 2/2003 | Riza |
| 6,636,654 | B2 | 10/2003 | McGuire, Jr. |
| 6,864,473 | B2 | 3/2005 | Chretien et al. |
| 7,142,744 | B2 | 11/2006 | Walter et al. |
| 7,158,180 | B2 | 1/2007 | Neidrich |
| 2002/0176151 | A1 | 11/2002 | Moon et al. |
| 2005/0083511 | A1* | 4/2005 | Markle ............................ 355/77 |
| 2006/0017990 | A1* | 1/2006 | Platt et al. ........................ 359/16 |
| 2007/0171292 | A1* | 7/2007 | Kondo et al. ................. 348/294 |
| 2011/0211077 | A1* | 9/2011 | Nayar et al. ............... 348/207.1 |

OTHER PUBLICATIONS

Fairchild Imaging, Inc. "CCD 181 Variable-Element High-Speed Linear Image Sensor", pp. 1-11, Milipitas, CA.

Newberry, Michael V., "CCD Imaging the Signal-to-Noise Connection"; Sky and Telescope; http://www.skypub.com/imaging/ccd/signalnoise.html; pp. 1-11.

Holmes, Alan, "CCD Imaging: Optimizing a CCD Imaging System"; Sky and Telescope; http://skypub.com/imaging/ccd/optimize.html; pp. 1-10.

Damjanovski, Viado, "CCD Chip Operation", CCTV, 1999, pp. 1-2; NSW, Australia.

"A Comparison of Various CCD Chips": The ATM Page—CCD Chip Comparison: http://www.atmpage.com/chip.html; pp. 1-5.

Zamkotsian, F., et al., "Characterization of MOEMS Devices for the Instrumentation of Next Generation Space Telescope", Proceedings of SPIE, 2003, vol. 4980, pp. 324-332.

* cited by examiner

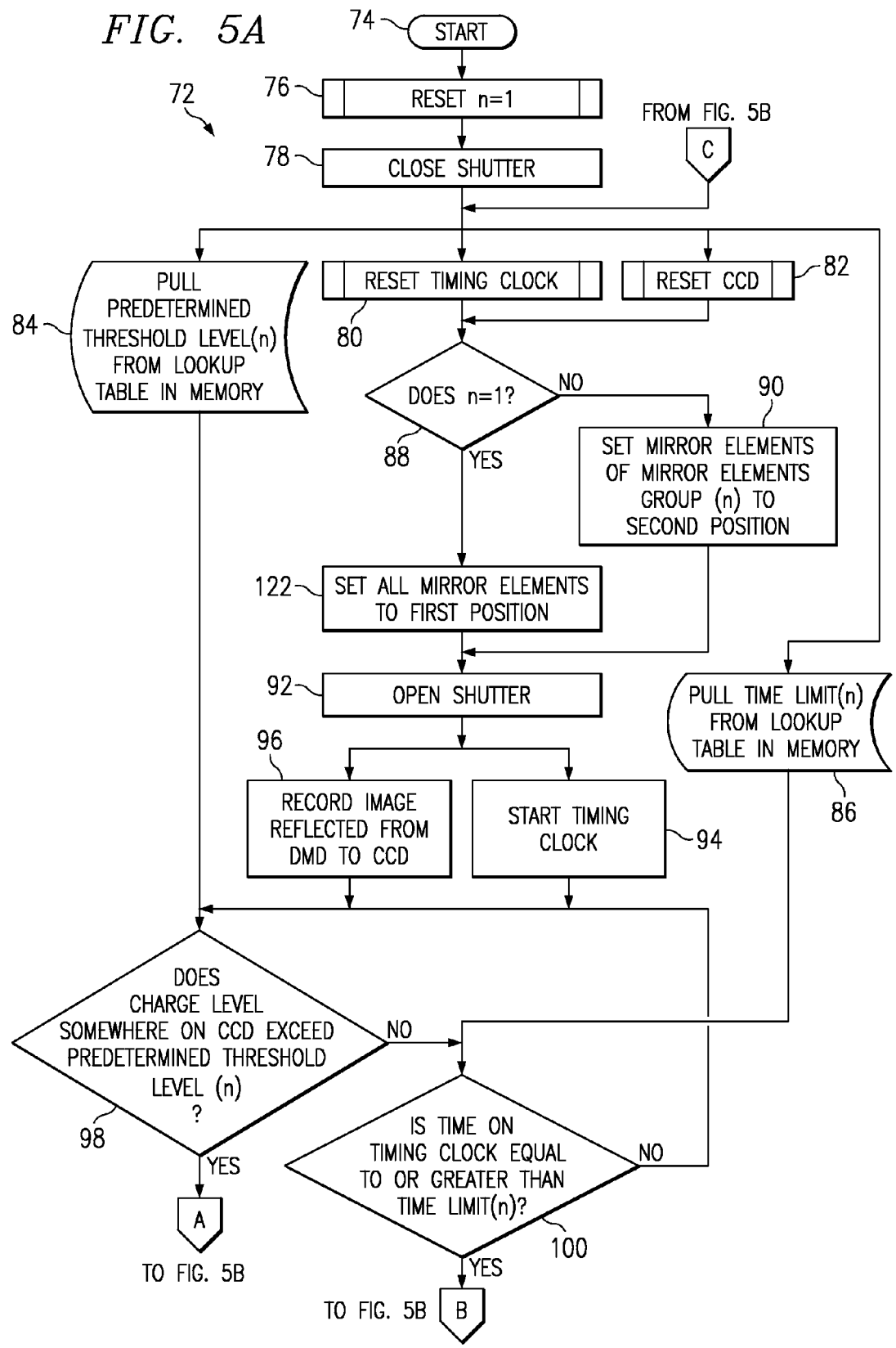

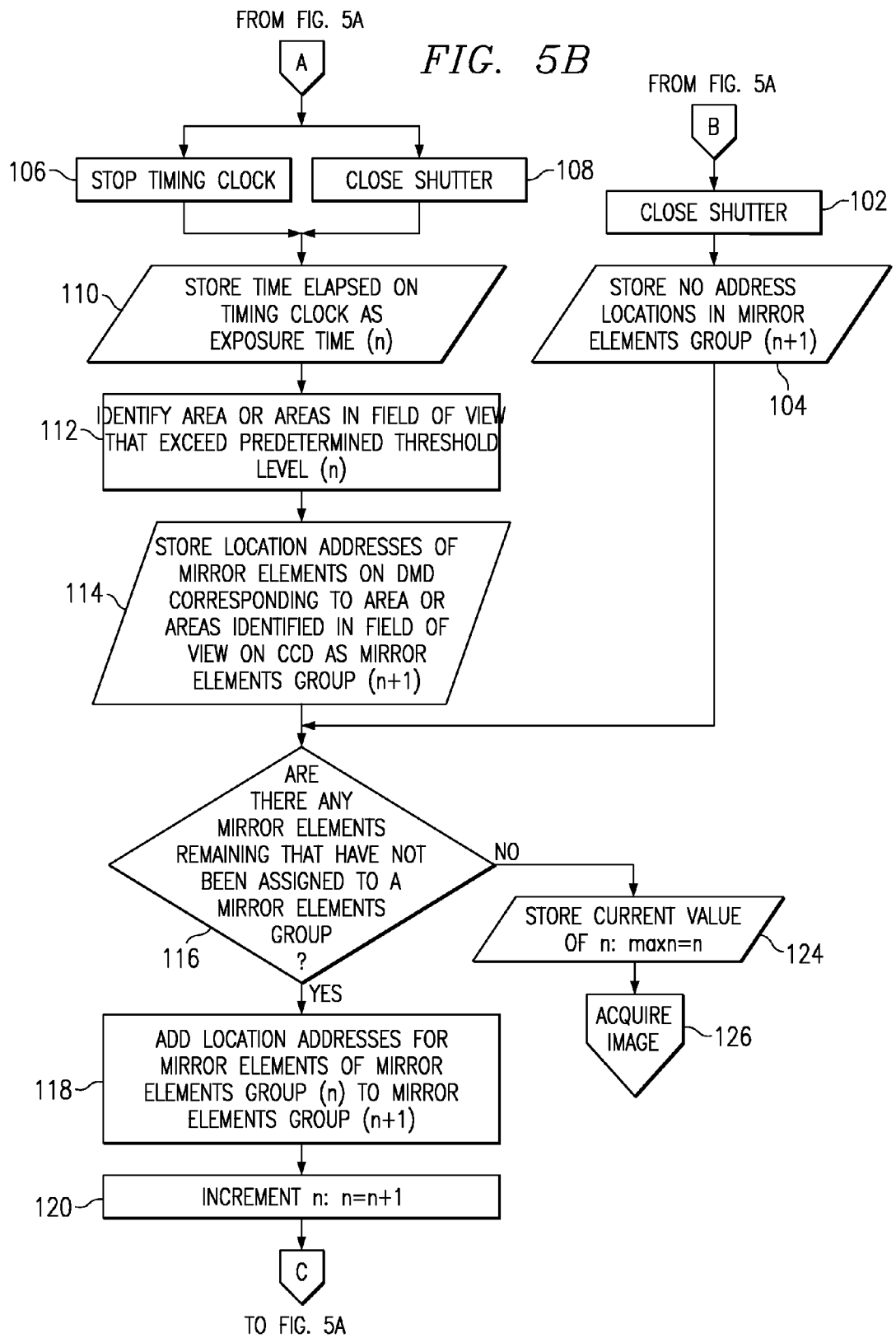

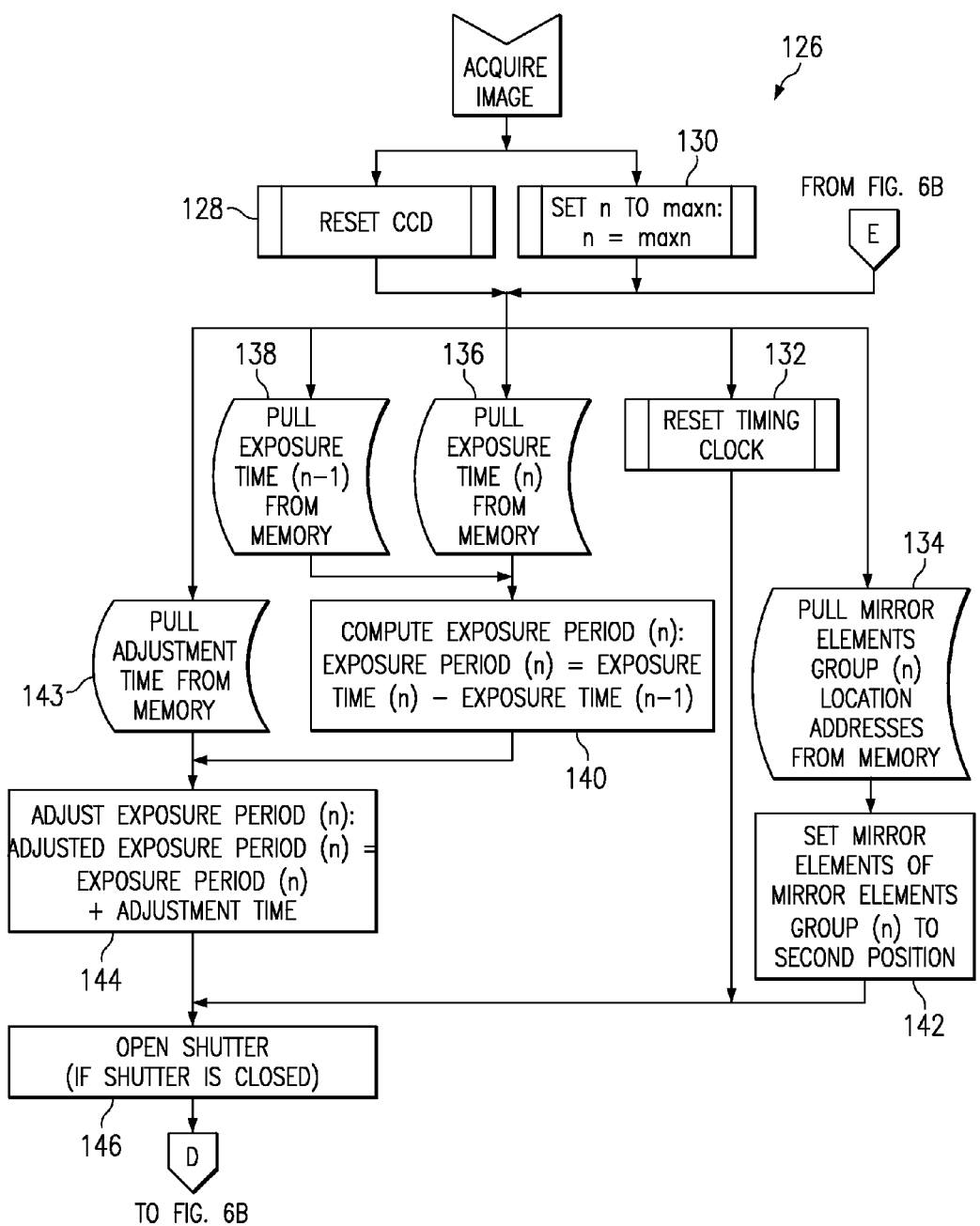

SYSTEM AND METHOD FOR VARYING EXPOSURE TIME FOR DIFFERENT PARTS OF A FIELD OF VIEW WHILE ACQUIRING AN IMAGE

This application is a divisional of application Ser. No. 11/556,720, filed Nov. 6, 2006, which is a divisional of application Ser. No. 10/035,868, filed Dec. 31, 2001, now U.S. Pat. No. 7,158,180.

FIELD OF THE INVENTION

The present invention relates to a system and method for varying exposure time for different parts of a filed of view while acquiring an image.

BACKGROUND

In astrophotography, it is often difficult to obtain an image of a more faint object, such as a nebula, a spiral arm of a distant galaxy, or a distant star, when there is a closer and brighter star along an immediately adjacent line of sight. The difficulty is that in trying to get a longer exposure time for the more faint object (e.g., to increase the signal-to-noise ratio), such longer exposure of the adjacent brighter star within the field of view often overexposes or saturates the area where the bright star is located and may cause bleeding or streaking into the immediate surrounding areas.

The recent use of digital image sensors, such as a charge coupled device (CCD), as well as the recent improvements in increased resolution (more pixels or sensors per square inch) and increased sensitivity (higher signal-to-noise ratio) for CCDs, has made it possible to obtain better images of faint objects. However, the problem of obtaining a good image of a more faint object adjacent to a bright object still persists. Not every photon that strikes a CCD element actually produces a count (adding another electron to the charge). Also due to the quantum nature of light, this hit-or-miss process of detecting light is somewhat random. Noise occurring within a CCD imaging process also occurs at a random rate. The noise can come from a variety of sources: readout noise, dark count noise, background noise, and processing noise. However, even in light of the inherent randomness of CCD light sensing, the desired signal (e.g., light from a celestial object) repeats at a random rate that is exponentially larger than the random rate of noise. In other words, noise does not contribute or register as many photon counts at a CCD element as fast as signals from an image or light source. Therefore as a general rule in CCD imaging, longer exposure times markedly improve the signal-to-noise ratio, and hence improve the image quality.

There are techniques for reducing readout noise in a CCD array to increase the signal-to-noise ratio (to improve the image quality and contrast), such as binning Binning is a process of combining adjacent pixels of a CCD into groups of "superpixels," such as two-by-two blocks of pixels or three-by-three blocks of pixels grouped together to form larger superpixels. Although binning may increase sensitivity, it does so at a sacrifice to resolution because binning effectively decreases the number of pixels per square inch. Hence, there is a need for a way to increase sensitivity without reducing resolution.

Another technique used in CCD imaging is antiblooming. As mentioned above, the problem that often arises with longer exposure times is saturation at areas within the field of view where a bright object floods the CCD elements with photons. Excess charge or buildup of electrons will sometimes bleed across a row or down a column of pixels causing an unwanted streak across the recorded image. Antiblooming tries to prevent such bleeding or streaking by diverting excess charge generated in the photosites to an antiblooming sink instead of the shift registers. Hence, the antiblooming technique acts as a clipping circuit for the CCD output. However, antiblooming may produce side effects like increased dark current (or dark count noise) and reduced sensitivity. Dark current is the accumulation of electrons at a CCD element, even in the absence of light, that produces a signal indistinguishable from one produced by light. Thus, a need exists for a way to handle such over-saturation events (e.g., bright objects in the field of view) that call for the use of antiblooming techniques, but without increased dark current and reduced sensitivity.

There are also other techniques for cleaning up an image after obtaining the image, such as digitally enhancing an image with a software application (e.g., Photoshop), tricolor imaging, or stacking images. But, such techniques can be time consuming and labor intensive. Also, such post-capture image processing challenges the integrity of the images. Hence, there is a need for a way to obtain or capture a better image in the first place before attempting to touch-up the image after it is recorded.

The technique of stacking images combined with other of the above techniques is currently one of the best known ways of generating an image or photograph that provides a high-quality image of faint objects and bright objects adjacent to one another. For example in stacking images, a first image may be taken from a first field of view that does not include the bright object or that only catches a small part of the bright object in a corner or edge of the image. This first image may be taken with a longer exposure time to obtain a better signal-to-noise ratio for the faint objects, and then the remnants of the bright image may be digitally cropped or deleted in post-image-capture processing. Then a second image with a different field of view including the bright object therein is obtained at a much shorter exposure time, which will likely result in a lot of background noise and very little, if any, capturing of the faint objects. Then the second image may be cropped and digitally enhanced with software to remove the background noise in post-image-capture processing. Next, the processed second image may be stacked with or onto the first image to provide a complete image for an artificial field of view including the bright and faint objects. Such stacking technique may require multiple layers and multiple images combined to obtain a comprehensive image containing bright and faint objects. However, again, such stacking may be quite time consuming and labor intensive, and the resulting image may not be proportional or to scale in the relationship among different portions of the image. Hence, this technique does not allow the desired image to be captured in a single field of view. Therefore, a need exists for a way to capture and record a high-quality image from a single field of view containing both bright and faint objects.

BRIEF SUMMARY OF THE INVENTION

The problems and needs outlined above are addressed by embodiments of the present invention. In accordance with one aspect of the present invention, a device for masking one or more selected areas of a field of view while capturing an image, is provided. The device comprises: an image aperture, a SLM, and an image capturing device. The image aperture is formed in the device. The SLM comprises an array of movable reflective elements. The SLM is positioned at a first angle with respect to a central axis of image light rays entering the device through the image aperture. Also, the SLM is positioned so that the image light rays will hit at least some of the reflective elements on the SLM. The image capturing device is used in recording the image, and it is located in a position so that, when at least some of the SLM reflective elements are in a first position, at least some of the image light rays reflected from the SLM reflective elements positioned in the first position will hit at least part of the image capturing device. The SLM may be a DMD, an anti-reflective membrane device, or a deformable film modulator device, for example. The image capturing device may be a digital light sensor, a CCD, photographic film, or a photo-reactive material that is formed on a semiconductor wafer, for example. The device may be a camera, part of a video camera, or adapted to be optically coupled to a telescope, for example.

In accordance with another aspect of the present invention, a system for reflecting a specified pattern of light rays onto a photo-reactive material layer, is provided. The photo-reactive material layer is formed on a semiconductor wafer. The system comprises a light source and a DMD. The light source is adapted to shine light rays into the system. The DMD comprises an array of movable mirror elements. The DMD is positioned at a first angle with respect to a central axis of the light rays entering the system from the light source. Also, the DMD is positioned so that the image light rays will hit at least some of the mirror elements on the DMD. The mirror elements of the DMD are controllably movable to a first position and to a second position. When one or more of the mirror elements are in the first positions, at least some of the light rays from light source are reflected from the DMD to the photo-reactive material. When one or more of the mirror elements are in the second position, at least some of the light rays from the light source are reflected away from the photo-resistive material.

In accordance with yet another aspect of the present invention, a device for masking one or more selected areas of a field of view while capturing an image, is provided. The device comprises: a first DMD, a second DMD, and a CCD. An image aperture is formed in the device. The first DMD comprises a first array of electrically controllable and movable mirror elements. The first DMD is positioned at a first angle with respect to a central axis of image light rays entering the device through the image aperture. Also, the first DMD is positioned so that the image light rays will hit at least some of the mirror elements on the first DMD. The second DMD comprises a second array of electrically controllable and movable mirror elements. The second DMD is positioned at a first spaced distance from the first DMD. The second array of mirror elements faces in an opposite direction than the first array of mirror elements. The second DMD is positioned so that, when at least some of the first DMD mirror elements are in a first position, at least some of the image light rays reflected from the first DMD mirror elements positioned in the first position will hit at least some of the second DMD mirror elements. The CCD comprises an array of photon sensing elements. The CCD is located in a position so that, when at least some of the second DMD mirror elements are in a first position, at least some of the image light rays reflected from the second DMD mirror elements positioned in the first position will eventually hit at least some of the CCD elements. The second DMD position may be offset relative to the first DMD position such that image light rays reflecting from the center of at least some of the first DMD mirrors at the first position hit a location on the second DMD where two or more second DMD mirror elements meet. Also, the second DMD position may be offset relative to the first DMD position such that image light rays reflecting from the center of at least some of the first DMD mirrors at the first position hit a location on the second DMD where two or more second DMD mirror elements meet. The second DMD may be substantially parallel to the first DMD. There may also be a third and fourth DMD between the second DMD and the CCD, which may increase the resolution for masking the image.

In accordance with still another aspect of the present invention, a method of astrophotography is provided. The method comprises the following steps, the order of which may vary: (i) during a first period of time, reflecting a first part of an image off of a first SLM at a first angle so that at least some of the first part of the image will eventually strike an image capturing device; (ii) also during the first period of time, reflecting a second part of the image off of the first SLM at a second angle that directs the second part of the image to a first location where the second part of the image will not go to the image capturing device; and (iii) during a second period of time, reflecting at least a portion of the second part of the image off of the first SLM at the first angle so that at least some of the second part of the image will eventually strike the image capturing device.

In accordance with another aspect of the present invention, a method of astrophotography is provided. The method comprises the following steps, the order of which may vary: (i) during a first period of time, reflecting a first part of an image off of a SLM at a first angle toward a second SLM; (ii) also during the first period of time, reflecting a second part of the image off of the first SLM at a second angle that directs the second part of the image to a first location where the second part of the image will not go to the second SLM; (iii) also during the first period of time, reflecting a third part of the image off of the second SLM at a third angle so that at least some of the third part of the image will eventually strike the image capturing device, wherein the third part of the image comprises a portion of the first part of the image; (iv) also during the first period of time, reflecting a fourth part of the image off of the second SLM at a fourth angle that directs the fourth part of the image to a second location where the fourth part of the image will not go to the image capturing device, wherein the fourth part of the image comprises another portion of the first part of the image; (v) also during the first period of time, striking at least part of the image capturing device with at least some of the third part of the image; and (vi) during a second period of time, reflecting a fifth part of the image off of the first SLM at a fifth angle so that at least some of the fifth part of the image will eventually strike the image capturing device, wherein the fifth part of the image comprises at least some of the second part of the image, and wherein the fifth angle is about the same as the first angle.

The method may further comprise the steps of: (vii) also during the first period of time, reflecting a sixth part of the image off of a third SLM at a sixth angle so that at least some of the sixth part of the image will eventually strike the image capturing device, wherein the sixth part of the image comprises a portion of the third part of the image; and (viii) also during the first period of time, reflecting a seventh part of the image off of the third SLM at a seventh angle that directs the seventh part of the image to a third location where the seventh part of the image will not go to the image capturing device, wherein the seventh part of the image comprises another portion of the third part of the image.

In accordance with another aspect of the present invention, a method of exposing different parts of a field of view for an image for various lengths of time, is provided. The method comprises the following steps, the order of which may vary: (i) during a first period of time, reflecting a first part of an image off of a first SLM at a first angle so that at least some of the first part of the image will eventually strike an image capturing device; (ii) also during the first period of time, reflecting a first remainder of the image off of the first SLM at a second angle that directs the first remainder of the image to a first location where the first remainder of the image will not go to the image capturing device, wherein the first remainder of the image is the image minus the first part of the image; (iii) during a second period of time, reflecting a second part of the image off of the first SLM at the first angle so that at least some of the second part of the image will eventually strike the image capturing device; (iv) also during the second period of time, reflecting a second remainder of the image off of the first SLM at the second angle that directs the second remainder of the image to the first location where the second remainder of the image will not go to the image capturing device, wherein the second remainder of the image is the image minus the second part of the image; (v) during a third period of time, reflecting a third part of the image off of the first SLM at the first angle so that at least some of the third part of the image will eventually strike the image capturing device; and (vi) also during the third period of time, reflecting a third remainder, if any, of the image off of the first SLM at the second angle that directs the third remainder of the image to the first location where the third remainder of the image will not go to the image capturing device, wherein the third remainder of the image is the image minus the third part of the image.

BRIEF DESCRIPTION OF THE DRAWINGS

Other objects and advantages of the invention will become apparent upon reading the following detailed description and upon referencing the accompanying drawings, in which:

FIG. 5 is a flowchart illustrating a process for automatically determining a masking area and its corresponding exposure time, provided by the first embodiment of the present invention;

DETAILED DESCRIPTION OF THE INVENTION

Figure 1:
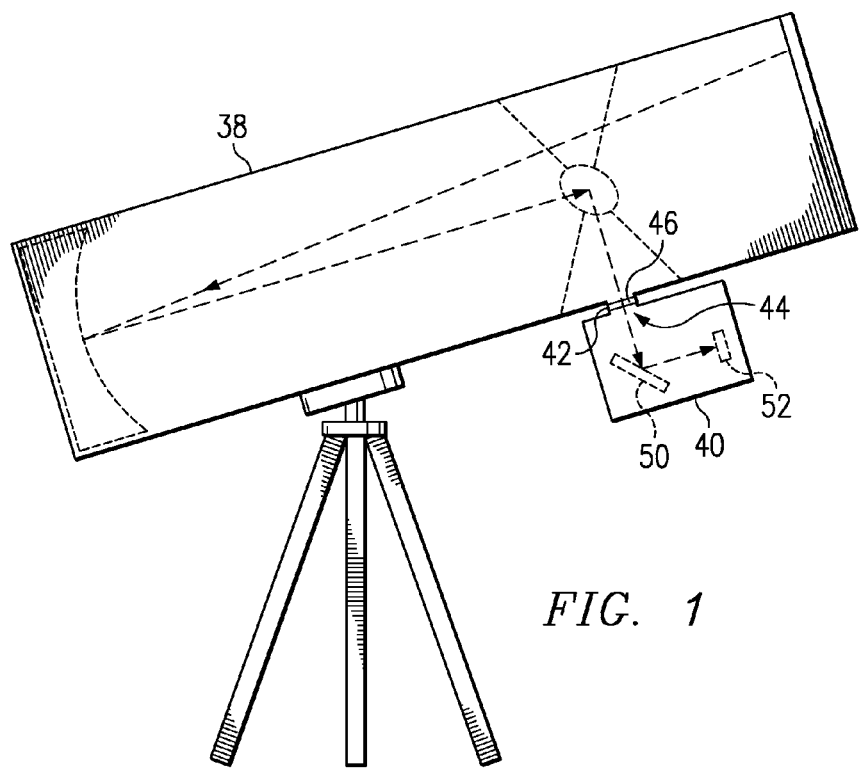
FIG. 1 is a schematic showing a telescope with a device in accordance with a first embodiment of the present invention.

Referring now to the drawings, wherein like reference numbers are used herein to designate like elements throughout the various views, embodiments of the present invention are illustrated and described. The figures are not necessarily drawn to scale, and in some instances the drawings have been exaggerated and/or simplified in places for illustrative purposes only. One of ordinary skill in the art will appreciate the many possible applications and variations of the present invention based on the following description of the example embodiments.

An embodiment of the present invention provides a way to expose different parts of a single field of view for various and differing lengths of time while capturing and recording the image. In doing so, unwanted light pollution or over-saturation bleeding from nearby or obtrusive stars may be greatly reduced or eliminated while still capturing the image of the nearby brighter star in the same field of view. Also, an embodiment of the present invention provides a way to have real-time contrast control while capturing an image. An embodiment of the present invention provides such techniques by using spatial light modulator (SLM) devices to control the different portions of light from an image that expose the film or CCD. As will be apparent from the embodiments described herein, there are many possible applications for the techniques and embodiments of the present invention.

Figure 2:
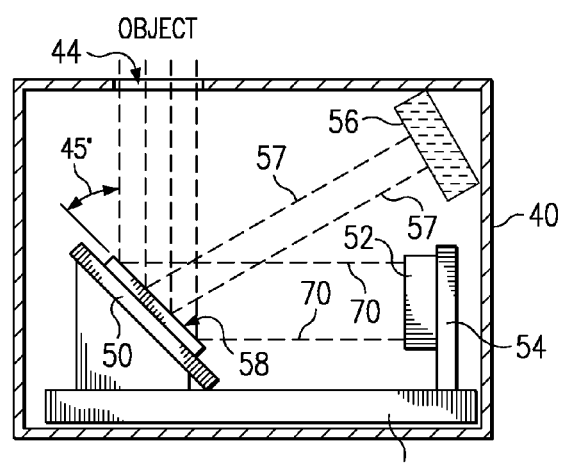
FIG. 2 is a schematic showing an enlarged view of the device of FIG. 1.

FIGS. 1 and 2 pertain to a first embodiment of the present invention. FIG. 1 shows a telescope application incorporating the first embodiment of the present invention. The telescope 38 shown in FIG. 1 is a Dobsonian mount telescope with a device 40 attached to the eyepiece location 42 for capturing and recording images of objects within the field of view of the telescope 38. However, many other types of telescopes may also incorporate an embodiment of the present invention. FIG. 2 shows an enlarged illustration of the device 40 of FIG. 1. The device 40 has an image aperture 44, which is optically aligned with the eyepiece aperture 42 on the telescope 38. There is a shutter 46 at the image aperture 44 (see FIG. 1, not shown in FIG. 2) on the eyepiece attachment portion 42 for preventing light from entering the device 40 when the shutter 46 is closed.

Referring to FIG. 2, the device 40 comprises a spatial light modulator (SLM) device 50 and an image capturing device 52. In the first embodiment, the SLM device 50 is a digital micro-mirror device (DMD) (DMDs are also sometimes known as a deformable mirror devices). There are many different types and designs of SLM devices, including but not limited to: DMDs, such as those developed by Texas Instruments, Inc.; anti-reflective membrane (AR membrane) devices, such as those developed by AT&T Bell Labs; and deformable film membrane devices, for example.

There are many different designs for DMDs that may be used in an embodiment of the present invention. Preferably, the DMD 50 can independently actuate mirror elements between a first position and a second position. The DMD 50 may also have the capability to actuate the mirror elements to more than two positions or oscillate the mirror elements. The image capturing device 52 in the first embodiment is a CCD (charge-coupled device), which captures an image and converts it to a digital signal corresponding to the image. However, there are many other types and designs of image capturing devices, including but not limited to: photographic film, photo-reactive material, diodes, solar cells, digital light sensors, and CCDs, for example. The DMD 50 and CCD 52 are electrically coupled to an electrical circuit 54. The electrical circuit 54 may have a bus and/or a port for being electrically coupled to a computer system (not shown). Thus, a controller (not shown) for the DMD 50 may be on the electrical circuit 54 in the device 40, it may be part of a computer system (not shown) electrically coupled to the device 40, or a combination thereof. Similarly, the processing and/or storing of signals from the CCD 52 corresponding to an image may be performed in the electrical circuit 54 of the device 40, within a computer system (not shown) electrically coupled to the device 40, or a combination thereof.

As shown in FIG. 2, the device 40 of the first embodiment further comprises a light absorbing portion 56 at a location where image rays 57 that are not intended to be recorded by CCD 52 may be deflected to, by the DMD 50, and absorbed. The light absorbing portion 56 may be, for example, a patch of light absorbing material, an object that is painted with a light absorbing substance, an object with a geometric shape that traps and cancels light, a portion of the device interior coated with a light absorbing material, or any combination thereof.

Figure 3:
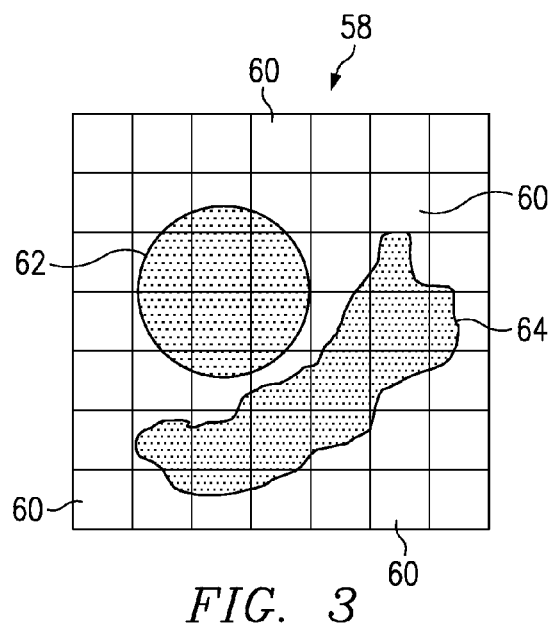
FIGS. 3 and 4 are each an image as seen on the DMD of FIG. 2.

FIG. 3 shows an image from the telescope 38 as seen on the face 58 of the DMD 50, i.e., on its array of movable mirror elements 60. For illustrative purposes only, the array of mirror elements 60 shown in FIG. 3 are greatly exaggerated in size. In an actual application, the DMD 50 will likely have an array of many more and much smaller mirrors (e.g., 0.017 inch× 0.017 inch square) than that shown in FIG. 3. In the example image of FIG. 3, there is a bright star 62 and a nebula 64, and the nebula 64 is faint compared to the bright star 62. As discussed above, it would be difficult to obtain a clear image of the nebula 64 with conventional equipment because the bright star 62 is immediately adjacent to the line of sight for the nebula 64. To address this problem, the first embodiment provides the ability to selectively and actively mask a brighter object while exposing a more faint object. Thus, in this example, it would be desirable to mask the bright star 62 while exposing the image of the nebula 64.

Figure 4:
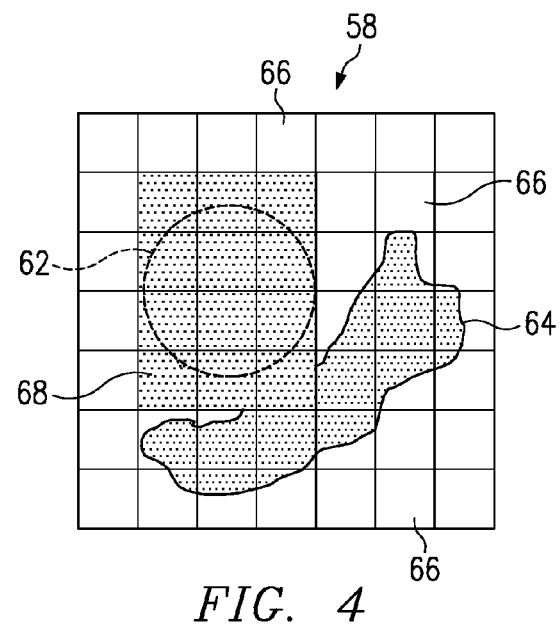

As shown in FIG. 4, the area of mirror elements 60 where the nebula 64 and background portions of the image are kept at a first position, which in this case is the default, unactuated and flat position. A selected group 68 of mirror elements on the DMD 50 are actuated and tilted to a second position over an area where the bright star image 62 hits the DMD 50. FIG. 2 shows a side view of the device 40 and illustrates some of the paths for the image light rays 57, 70. The image light rays 70 that strike the mirror elements 60 in the first position on the DMD face 58 are reflected to the CCD 52. The image light rays 57 that strike the selected group 68 of mirror elements 60 in the second position on the face 58 of the DMD 50 are reflected in a direction away from the CCD 52, and in this case, toward the light absorbing portion 56. Hence, the image light rays 57 for the bright star 62 are filtered out and absorbed rather than being routed to the CCD 52.

Note that in other embodiments, the second position may be the default, relaxed position for the mirror elements, and the first position may be the actuated position. Hence, the first and second positions for each DMD may be arbitrarily labeled or chosen. Furthermore, in yet another embodiment, there may be three positions, wherein a first position for each mirror element is actuated or tilted to one side, a second position for each mirror element is the default relaxed position, and a third position for each mirror element is actuated or tilted to another side.

The selection of the area or group 68 of mirror elements 60 on the DMD 50 to be actuated to the second position to mask part of the image may be done manually or automatically. For example, device 40 may initially allow the entire image to strike the CCD 52. The CCD 52 then may send the initial image to a computer system (not shown) to display the entire image on a grid corresponding to the array of mirror elements 60 on the DMD 50. The hardware and/or the software providing the instructions and code for displaying the initial image on the grid may then allow a user to select an area or areas that the user wants to be masked. The computer system may also allow the user to select the amount of time to selectively mask the selected area(s) of the image. For example, the user may click on or highlight areas in the grid using a mouse to selected the areas to be masked.

In another variation, the selection of areas to be masked by the DMD 50 may be performed automatically by hardware and/or software on the electrical circuitry 54 and/or on an external computer system (not shown). For example, the device 40 may at first allow the entire image to be reflected off of the DMD 50 to the CCD 52 for an initial image reading. Then based on the initial image, a first group of mirror elements corresponding to the brightest areas detected by the CCD 52 are determined. Repeating this exposure process with the first group of mirror elements actuated to a second position, the areas of the remainder of the image (portions not masked by first group of mirror elements) can then be analyzed to establish a second group of the second brightest portions. This process can be continually repeated until all of the image has been analyzed. Then using the information gathered from the analysis, the image may be recorded, and while recording, the exposure time may vary for different areas within the same field of view so that each area obtains the optimum exposure time based on its brightness.

Figure 6B:
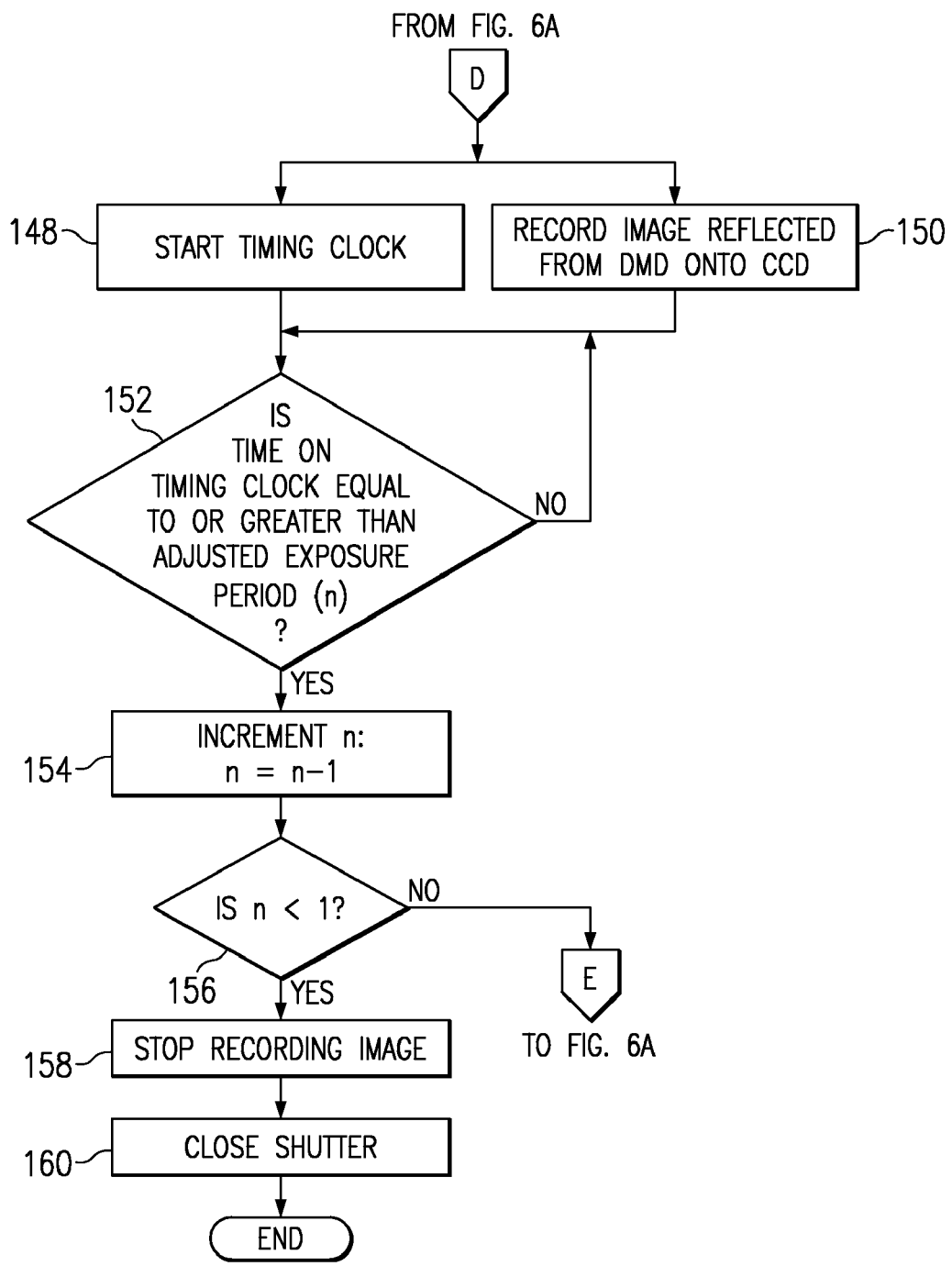
FIG. 6 is a flowchart illustrating a process for automatically varying the exposure time for different areas of the same field of view, provided by the first embodiment of the present invention.

FIGS. 5 and 6 show an example process that may be performed to automatically select the areas to be masked and the corresponding exposure time for each selected area. FIG. 5 is a flowchart for the process 72 of analyzing the image to estimate the optimum exposure time for each portion of the field of view and to establish groups of mirror elements 60 for use in actively masking portions of the image and varying the masking areas as needed as the exposure time varies. Beginning at the start of the flowchart in FIG. 5 (start block 74), a counting variable "n" is set or reset to a value of one (initialization block 76). Then, if the shutter is not already closed, the shutter is closed (action block 78) to prevent light from entering the device 40. Next and in parallel, a timing clock is reset to zero (initialization block 80), the CCD is reset (any prior charges flushed out) (initialization block 82), the first predetermined threshold level (corresponding to n=1) is obtained from a lookup table in memory (data retrieval block 84), and the first time limit (for n=1) is obtained from a lookup table in memory (data retrieval block 86). Next, it is determined whether the current value of n is equal to one (decision block 88), which it is because the process just started. Because the process has just started (n=1), all mirror elements are set to the first position (action block 90), which is the default (relaxed) position in this case. The shutter is then opened (action block 92). Then, immediately (or simultaneously with the opening of the shutter), the timing clock is started (action block 94) and the device begins recording the image reflected from the DMD 50 and exposed onto the CCD 52 (action block 96).

Still referring to FIG. 5, a looping sequence is begun (see decision block 98). It is determined whether the charge level (or photon count on a register) somewhere on the CCD 52 exceeds the first predetermined threshold level (decision block 98). If the first threshold level is not exceeded (decision block 98), it is then determined whether the time elapsed on the timing clock has reached the first time limit (decision block 100). If the first time limit has not been reached (decision block 100), the looping sequence repeats at decision block 98. If the time limit is met by the timing clock before the charge level somewhere on the CCD 52 exceeds the first predetermined threshold level (decision block 100), then this looping sequence is ended because it is assumed that the light from the image will not cause a charge level on the CCD 52 to exceed the threshold level, and the shutter is closed (action block 102). Because the charge level does not exceed the current threshold level, no area is selected for masking (data storage block 104). In other words, no address location for the mirror elements are stored for the next mirror elements groups (corresponding to the next count n+1) (data storage block 104) because there are no mirror elements that need to be masked for this threshold level.

Returning to decision block 98 in FIG. 5, if or when the charge level somewhere on the CCD 52 exceeds the current threshold level, the timing clock is stopped (action block 106) and the shutter is closed (action block 108). The shutter is closed at this point (rather than later) so that the CCD 52 can begin to be reset. The time elapsed on the timing clock is then stored in an exposure time (n) variable (data storage block 110). Next the area or areas in the field of view on the CCD 52 that exceeded the current threshold level are identified (action block 112). Then the location addresses of the mirror elements 60 on DMD 50 corresponding to the area or areas identified in the field of view of the CCD 52 are stored as the next mirror elements group (e.g., mirror elements group (2) corresponding to n=2) (data storage block 114). Next, it is determined whether any of the mirror elements 60 remaining have not been assigned to a mirror elements group (decision block 116). If there are still mirror elements 60 that have not been assigned to a mirror elements group (decision block 116), then the location addresses stored for the mirror elements group (n) are added into the mirror elements group (n+1) (action block 118). Thus, each subsequent mirror elements group will contain any new mirror element location addresses identified, as well as all of the prior mirror element location addresses for all prior mirror elements groups. Hence, as the process progresses, the area of the image masked should be increasing until eventually all (or most all) of the mirror element location addresses have been assigned to a mirror elements group.

Next the value for n is incremented by adding one (n=n+1) (action block 120), and the process repeats again (see initialization block 80). The second time through the process, n will equal 2 (see decision block 88), and the mirror elements for the current mirror elements group (corresponding to n=2) are actuated to a second position (action block 122). Thus, when the image is reflect off of the DMD 50, the portions of the image field of view that hit the mirror elements in second position will be masked from the CCD 52. In other words, the remainder of the image in the field of view will be reflected to the CCD 52 by the remaining mirror elements in the default first position. Therefore, during masking, only a portion of the field of view will expose the CCD 52 and the brighter portions will be masked.

By masking the brightest objects in the field of view, the second brightest objects may then be better identified than if the entire image is reflected onto the CCD 52. Hence, an embodiment of the present invention provides an advantage that areas of varying levels of brightness can be more precisely identified in an incremental manner to generate a relative brightness histogram or map for the image.

Referring again to decision block 116 of FIG. 5, if there are no more mirror elements remaining to be assigned to mirror elements groups (or if there have been a sufficient number of iterations through the process to determine that there is little or no variation of brightness across the field of view for the image), then the current value of n is stored in memory as "maxn" (data storage block 124), which represents the total number of iterations performed by the process 72 of FIG. 5.

Thus, at this point in FIG. 5, the estimated elapse time of exposure needed for each group of mirror elements has been automatically obtained. Next, the image may be acquired using this information to actively control the masking of the image as the exposure time increases. The "Acquire Image" block 126 in FIG. 5 refers to (i.e., is a jump to) the process 126 illustrated by the flowchart in FIG. 6.

FIG. 6 is a flowchart for the process 126 of acquiring and recording the image using the information obtained from the analysis performed during the process 72 of FIG. 5. At the beginning of the acquiring image process 126 of FIG. 6, the CCD is reset (initialization block 128) and the value of the counter n is set to the maximum number of counts taken (maxn) (initialization block 130) in the process 72 of determining the masking sequence (FIG. 5 flowchart). Next, the timing clock is reset (initialization block 132) and the parameters for the first exposure period are pulled from memory. Hence for n=maxn, the mirror elements group (maxn) (data retrieval block 134), the exposure time (maxn) (data retrieval block 136), and the exposure time (maxn−1) (data retrieval block 138) are pulled from memory. Next the first exposure period (maxn) is computed (action block 140). Because in the prior process 72 of FIG. 5 the exposure time for each area was determined starting with a reset CCD 52, the exposure times for these areas will overlap until the shortest exposure time (e.g., for the brightest area) is added. Hence, the first exposure period (maxn) equals exposure time (maxn) minus exposure time (maxn−1) (action block 140). In other words, the first exposure period is the longest exposure time minus the second longest exposure time.

The mirror elements on the DMD for mirror elements group (maxn) are set to the second position (action block 142). Hence, the mirror elements of mirror elements group (maxn) are tilted so that the image reflecting from mirror elements group (maxn) do not reflect to the CCD 52 and are thereby masked from the record image on the CCD 52. The remaining mirror elements will be in the first position (default, relaxed position), which will reflect the image to the CCD 52. Thus for the first exposure period, where n=maxn, only an area or areas of the image that need the longest exposure time relative to the remaining area(s) will be reflected to the CCD 52 for exposure.

Also, an adjustment time is pulled from memory (data retrieval block 143). The adjustment time may be negative, zero, or positive for any given exposure period, and the adjustment time may be set or adjusted as needed. For example, an adjustment time may be needed based on the particular hardware (e.g., CCD 52) used or based on the amount of time it takes perform the software algorithms, reset the timing clock, and set the positions of the next group of mirror elements. The first exposure period (maxn) is then adjusted by the adjustment time by adding the adjustment time to the exposure period (maxn) (action block 144).

With the mirror elements set up (action block 142), the adjusted exposure period computed (action block 144), and the timing clock reset (initialization block 132), the shutter is opened (action block 146) to let the image shine into the device 40 and onto the DMD 50. At this time, the timing clock is started (action block 148) and the CCD 52 begins recording the image it receives (action block 150). A timing loop then begins (see decision block 152) to check for whether the time on the timing clock is equal to or greater than the current adjusted exposure period (maxn). When the time on the timing clock equals or exceeds the current exposure period (decision block 152), the value of n is incremented to the next count value (action block 154), which is n−1 (i.e., decreasing n by 1).

Next it is determined whether the value of n is less than one (decision block 156). A value of n less than one (decision block 156) will signify that the complete image has been obtained and that the entire exposure time (i.e., longest exposure time (maxn)) has elapsed. When n is less than one (decision block 156), the CCD 52 stops recoding the image (action block 158) and the shutter is closed (action block 160). Because we are still at the first exposure period, assuming there is more than one exposure period for this example case, n will not be less than one and the loop of obtaining the image is repeated (see initialization block 132). Thus, as the loop is repeated for n=maxn−1, the timing clock is reset (initialization block 132), the exposure times for n and n−1 are pulled from memory (data retrieval blocks 136, 138), the second exposure time is computed and adjusted (action block 140), and the group of mirror elements for n=maxn−1 are set to the second position (action block 142) while the remaining mirror elements default to the first position.

Figure 7:
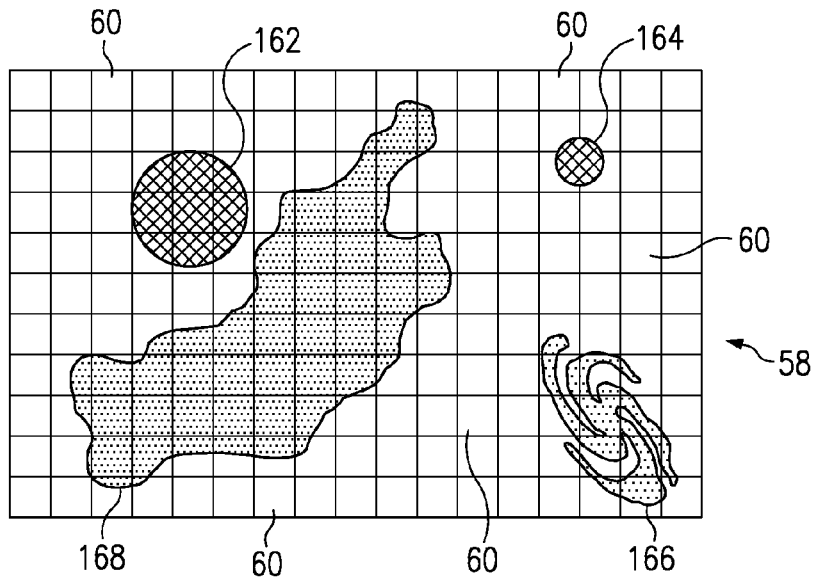
FIGS. 7-14 are each an image as seen on a DMD as different areas of the image are masked by the DMD.

Consider the following example to illustrate the culmination of the exposure periods. FIG. 7 illustrates another example image for a field of view as seen on the face 58 of a DMD 50 having an array of movable mirror elements 60. In FIG. 7, there is a relatively large and bright star 162; a smaller, more distant, and dimmer star 164; a galaxy 166; and a nebula 168 adjacent to the line of sight of the large bright star 162.

During the process of determining the exposure times and areas to be masked for the exposure sequence, four areas for four exposure times are established. For n=1, a first area requires an exposure time of one second corresponding to the large bright star 162. For n=2, a second area requires an exposure time of seven seconds corresponding to the farther and dimmer star 164. For n=3, a third area requires an exposure time of ten seconds corresponding to the galaxy 166. And for n=4, a fourth area, which is the remainder (i.e., total area=area1+area2+area3+area4), requires an exposure time of 12 seconds corresponding to the nebula 168 and the more distant stars making up the background. Thus, for this example, the following values stored in memory:

| n | mirror elements group (n) | exposure time (n) [seconds] | exposure period (n) [seconds] = exposure time (n) − exposure time (n − 1) |
|---|---|---|---|
| 0 | none | 0 | 0 |
| 1 | none | 1 | 1 |
| 2 | area1 | 7 | 6 |
| 3 | area1 + area2 | 10 | 3 |
| 4 | area1 + area2 + area3 | 12 | 2 |

Using the values of this example and stepping through the process 126 illustrated in FIG. 6, when n=4 (maxn=4), the exposure time (4) of 12 seconds and the exposure time (3) of 10 seconds are pulled from memory (data retrieval blocks 136 and 138). Also the location addresses for mirror elements group (4), which provide a combination of area1, area2, and area3, are pulled from memory (data retrieval block 134). The mirror elements of area1, area2, and area3 are tilted to the second position (action block 142), and the remaining mirror elements (area4) remain in the default first position. The computed exposure (4) is 2 (12 seconds−10 seconds) (see action block 140). In this example, the adjustment time is assumed to be −0.3 seconds (data retrieval block 143), and thus the adjusted exposure period is 1.7 seconds (2 seconds+−0.3 seconds) (see action block 144). This adjustment time in this example is the amount of time that it takes for the steps of the algorithm to perform their checks and provide instructions to change the mirror elements 60 to the next masking position on the DMD 50. After opening the shutter (action block 146), the timing clock is started (action block 148) and monitored until it reaches 1.7 seconds (see decision block 152). Hence, the actual exposure time for area4 should come out to approximately 2 seconds for the first exposure period, as needed.

Then, n is decreased by one (n=3) (action block 154), and the loop is repeated (see decision block 156). For n=3, the exposure time (3) minus the exposure time (2) provides an exposure period (3) equal to 3 seconds (10 seconds−7 seconds). Also for n=3, the mirror elements group (3) corresponding to area1 and area2 are tilted to the second position and the remaining mirror elements are set to the default mirror position. Because the mirror elements that were previously tilted to the second position when n was 4 were area1, area2, and area3, and because the mirror elements tilted to the second position when n is 3 are area1 and area2, essentially what happens is that the mirror elements for area3 are released to go back to the default first position. And, the CCD 52 is continuously recording the image exposed on it as the mirror elements change positions.

Figure 8:
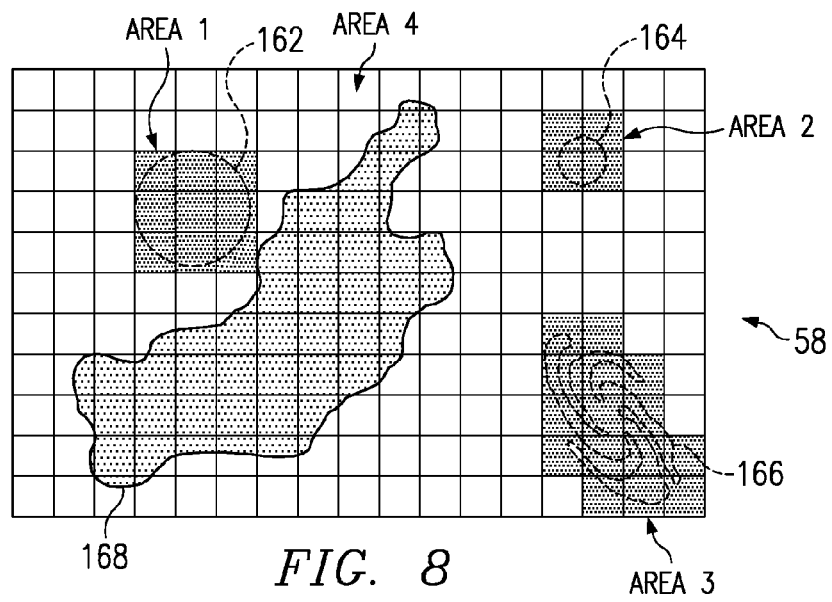
Figure 9:
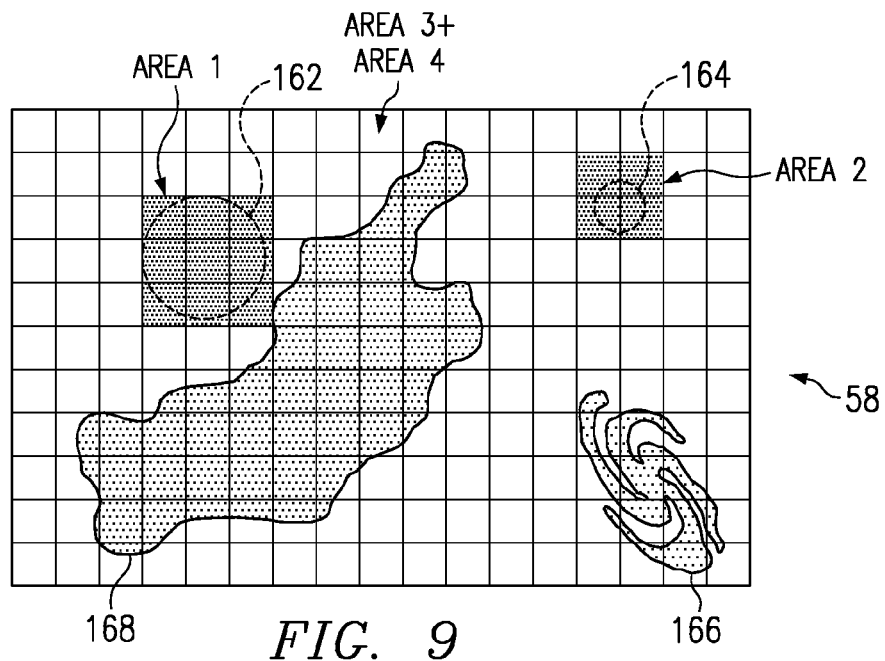
Figure 10:
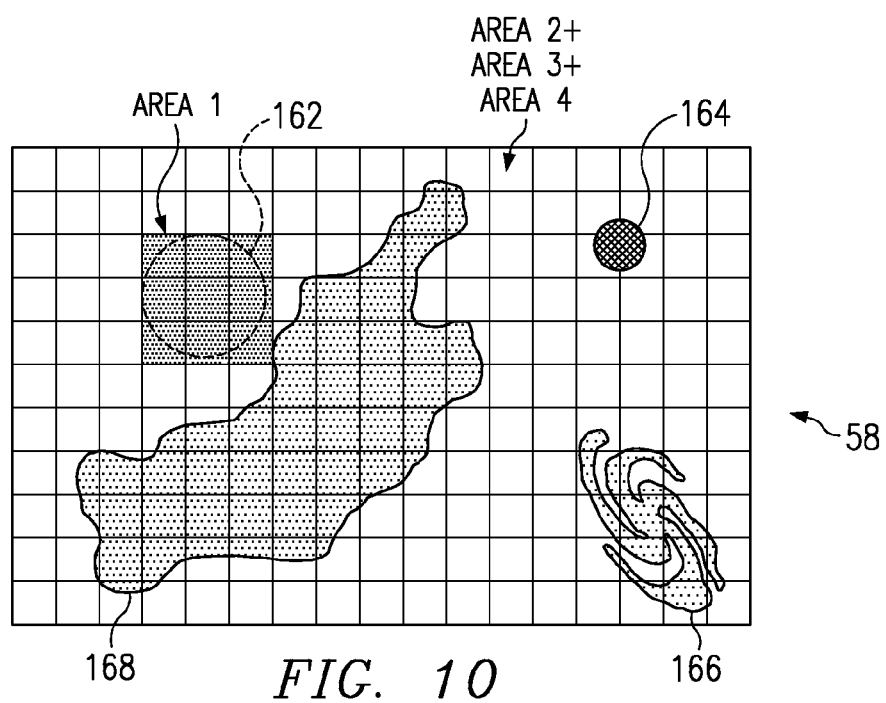
Figure 11:
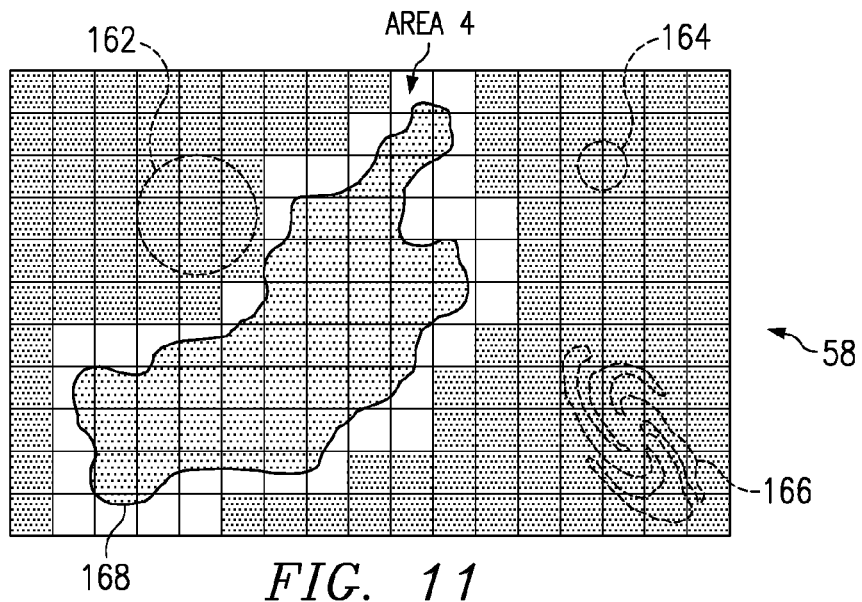
Figure 12:
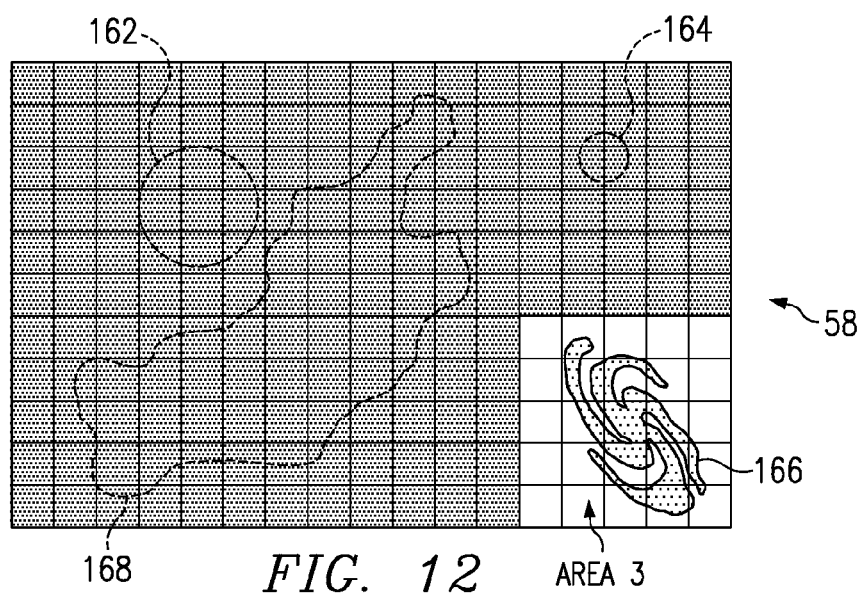
Figure 13:
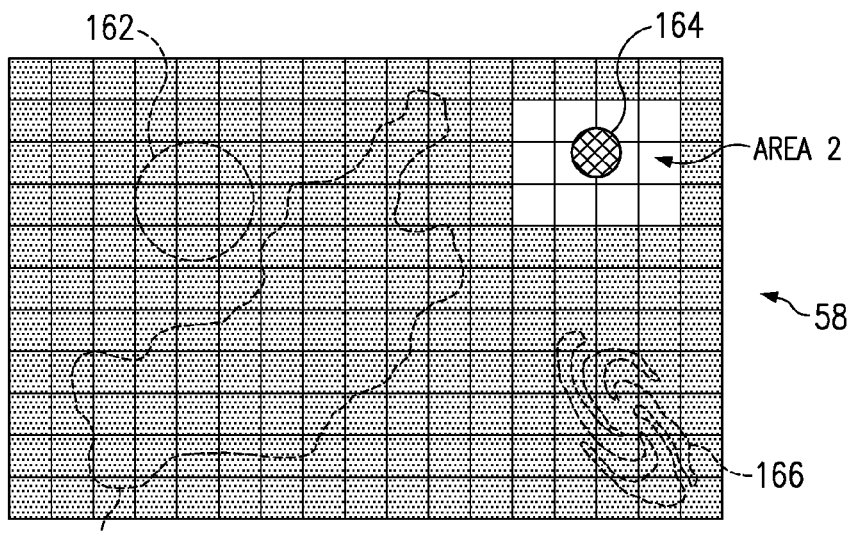
Figure 14:
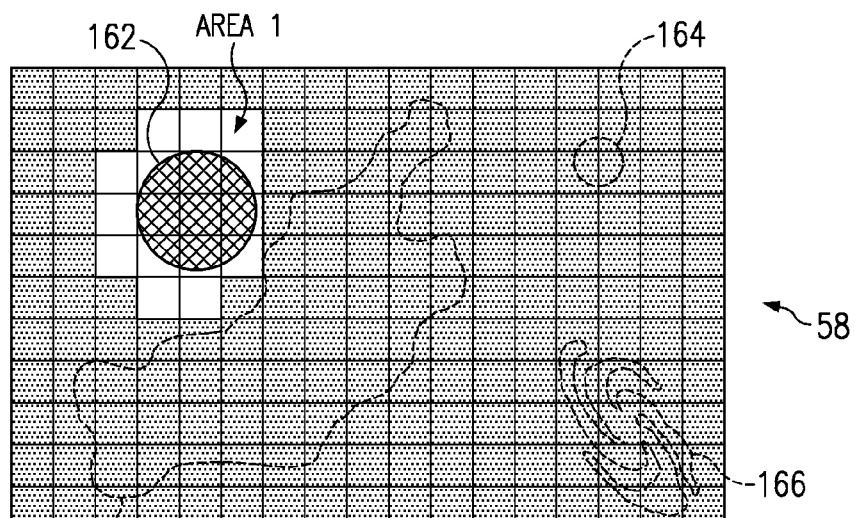

Thus as shown in FIG. 8, and following the procedure outlined in FIG. 6, area4 corresponding to the nebula 168 and the background is first exposed for 2 seconds while area1, area2, and area3 are masked by the DMD 50 mirror elements in the second position. Then as shown in FIG. 9, area3 and area4 are exposed for 3 seconds while area1 and area2 are masked by the DMD mirror elements in the second position. Then as shown in FIG. 10, area2, area3, and area4 are exposed for 6 seconds while area1 is masked by the DMD mirror elements in the second position. Finally, the entire image is exposed on the CCD (as shown in FIG. 7) and no mirror elements 60 are in the second position for 1 second, and then the shutter is closed (action block 160) and the recording is complete (see action block 158). Note that area4 received a total exposure time of about 12 seconds (2+3+6+1) as needed. Likewise, area3 received a total exposure time of about 10 seconds (3+6+1), area2 received a total exposure time of about 7 seconds (6+1), and area1 received a total exposure time of about 1 second. The resulting recordation by the CCD 52 should thus provide an optimum signal-to-noise ratio for each of these areas to strive for the highest quality recorded picture. Therefore in this example of using the first embodiment of the present invention, the exposure time was automatically varied for different areas of a single field of view while acquiring the image and recording it.

It should be noted that the automatic processes 72, 126 described in FIGS. 5 and 6 is just one example of the use of the first embodiment. One of ordinary skill in the art with the benefit of this invention disclosure may realize other variations to the processes of using the first embodiment.

Also, the sequence of obtaining the image may be performed differently. For example, as shown in FIGS. 11-14, each area may be obtained separately, and later combined or keep separate, as desired. Hence, with the DMD 50 providing a mask as in FIG. 11, just the nebula 168 may be exposed for 12 seconds and stored in memory as a first data file. Or, in alternative to FIG. 11, with the DMD 50 providing a mask as in FIG. 8, just the nebula 168 and the background may be exposed for 12 seconds and stored in memory as a first data file. Then, with the DMD 50 providing a mask as in FIG. 12, just the galaxy 166 may be exposed for 10 seconds and stored in memory as a second data file. With the DMD 50 providing a mask as in FIG. 13, only the dimmer star 164 may be exposed for 7 seconds and stored in memory as a third data file. And finally, with the DMD 50 providing a mask as in FIG. 14, just the bright star 162 may be exposed for 1 second and stored in memory as a fourth data file. After acquiring these images, the images may then be stacked or combined (manually, or automatically by hardware and/or software) to form a complete image of the field of view.

Figure 15:
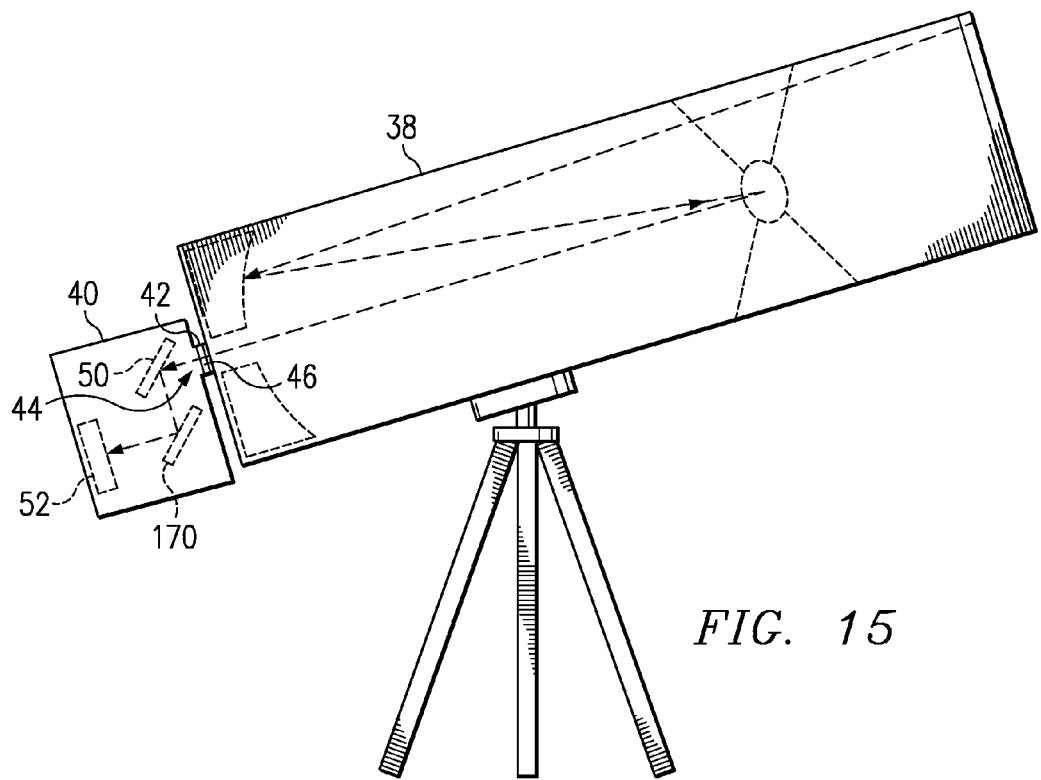
FIG. 15 is a schematic showing a telescope with a device in accordance with a second embodiment of the present invention.
Figure 16:
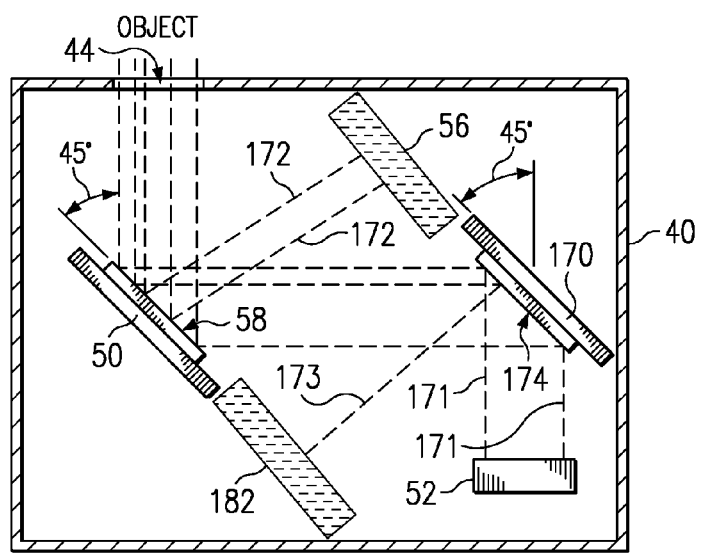
FIG. 16 is a schematic showing an enlarged view of the device of FIG. 15.

FIGS. 15 and 16 illustrate a second embodiment of the present invention. FIG. 15 shows telescope application incorporating the second embodiment of the present invention. The telescope 38 shown in FIG. 15 is a Schmitt Cassigrain mount telescope with a device 40 attached to the eyepiece location 42 for capturing and recording images of objects within the field of view of the telescope 38.

Figure 17:
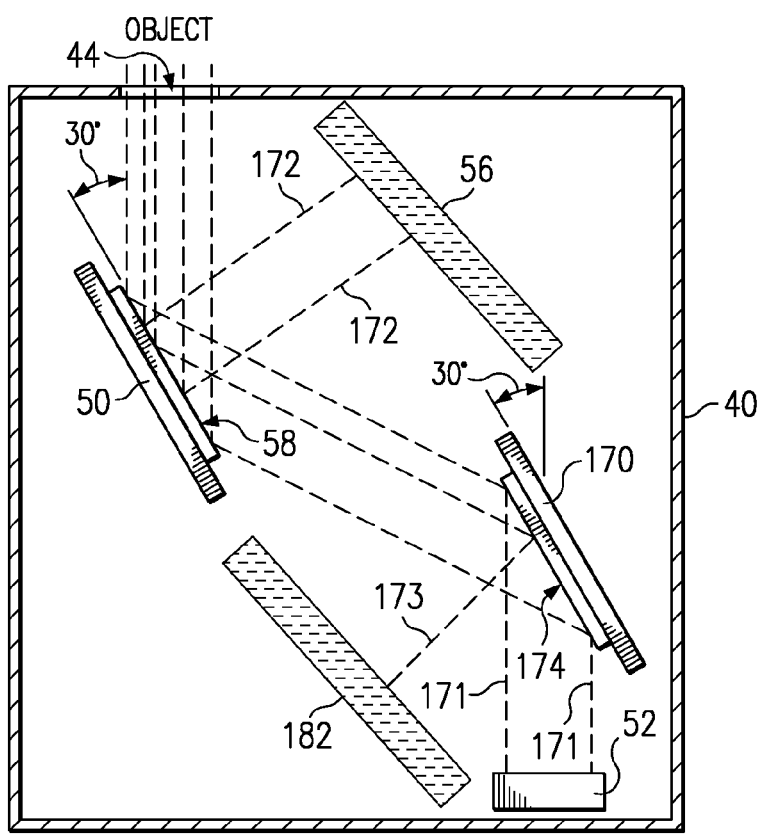
FIG. 17 is a schematic showing a variation of the device of FIG. 16.

FIG. 16 shows an enlarged illustration of the device 40 of FIG. 15. The device 40 of the second embodiment has two DMDs 50, 170 and one CCD 52. The first DMD 50 is positioned at about a 45 degrees angle with respect to a central axis (not shown) of the image light rays 171-173 entering the device 40. However, as illustrated in FIG. 17 for a variation of the second embodiment, the angular alignment of the first DMD 50 relative to the central axis of the image light rays may vary. For illustration purposes only, the few image light rays 171-173 shown in FIGS. 16 and 17 are shown as being parallel with each other across the field of view. However in practice, the image light rays 171-173 may be converging or diverging with respect to each other due to lenses (not shown) ahead of, between, and/or after the DMDs 50, 170.

Referring again to FIG. 16, the second DMD 170 is approximately parallel to the first DMD 50. The second DMD 170 is positioned at a spaced distance from the first DMD 50, and the second DMD 170 is positioned so that at least part of the image will be reflected from the first DMD 50 onto the second DMD 170 and further reflected from the second DMD 170 to the CCD 52. Also, the second DMD 170 is shifted by about one-half the width of a single mirror element 60 relative to the first DMD 50 so that image rays reflected from the center of a first DMD mirror element 60 will hit a location on the second DMD 170 where two or more mirror elements 60 meet on the second DMD 170 (see FIG. 18 for illustration).

Figure 18:
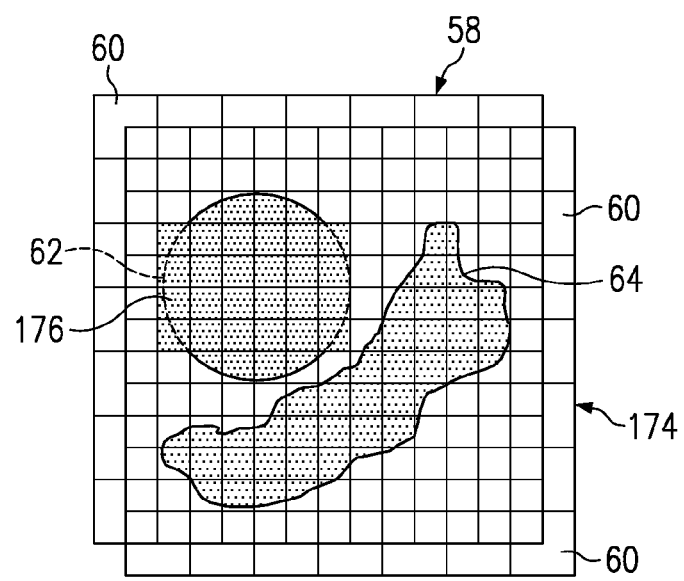
FIGS. 18 and 19 are each an image as seen from the CCD in the device of FIG. 16.
Figure 19:
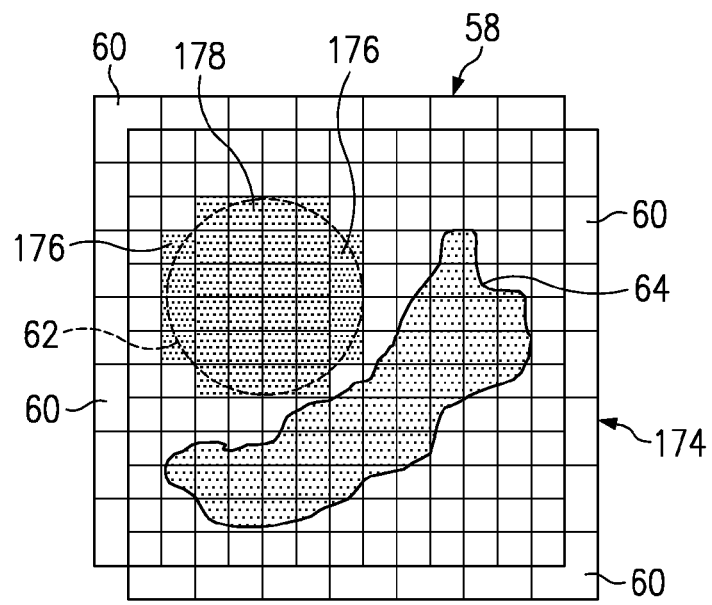

In the second embodiment, the first DMD 50 is identical to the second DMD 170, and both have an array of movable micro-mirror elements 60 on their faces 58, 174. However in other embodiments, the first and second DMDs 50, 170 may not be identical. FIG. 18 shows the face 174 of the second DMD 170 superimposed onto the face 58 of the first DMD 50, as aligned by the image rays and as would be seen from the CCD 52. In FIG. 18, the shaded squares 176 represent the mirror elements on the first DMD face 58 that are tilted to a second position to mask the portions of the image 172 striking the mirror elements 176 tilted to the second position (see reflections of image light rays 172 in FIG. 16). In FIG. 19, the darker shaded squares 178 represent the mirror elements on the second DMD face 174 that are tilted to a second position to mask the portions of the image 173 reflected from the first DMD 50 that strike the mirror elements 178 tilted to the second position (see reflections of image light rays 173 in FIG. 16). Hence, the image light rays 172 (see FIG. 16) that strike the mirror elements 176 tilted to the second position on the first DMD face 58 (see FIG. 18) are reflected to the first light absorbing portion 56 (see FIG. 16). The image light rays 173 (see FIG. 16) that strike the mirror elements 178 tilted to the second position on the second DMD face 174 (see FIG. 19) are reflected to the second light absorbing portion 182 (see FIG. 16). The combination of the tilted mirror elements 176 on the first DMD face 58 and the tilted mirror elements 178 on the second DMD face 174 completely mask the star 62 from the portions of the image 171 that reflect off of the first DMD 50 to the second DMD 170 and further to CCD 52 (see reflection paths shown in FIG. 16).

As illustrated in FIGS. 18 and 19, this shifting of the second DMD 170 relative to the first DMD 50 provides higher resolution for masking using the DMDs 50, 170, as compared to masking with a single DMD 50 (see first embodiment shown in FIG. 4). Thus in FIGS. 18 and 19, when masking the same image shown in FIGS. 3 and 4 with the two DMDs 50, 170 of FIG. 16, notice that the higher resolution allows the star 62 to be more precisely masked. In FIG. 4, note that part of the nebula 64 is masked, whereas in FIG. 19, none of the nebula 64 is masked. Thus, the use of more than one DMD may provide the advantage of increased masking resolution without significantly degrading the quality of the image recorded.

Figure 20:
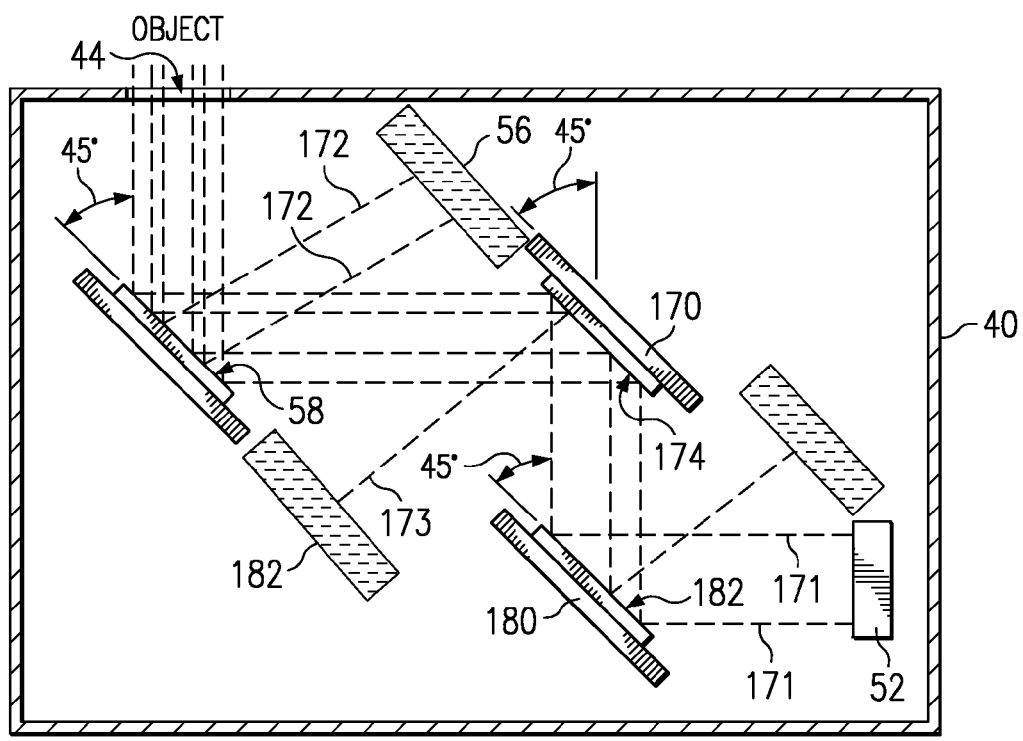
FIG. 20 is a schematic showing a device in accordance with a third embodiment of the present invention.
Figure 21:
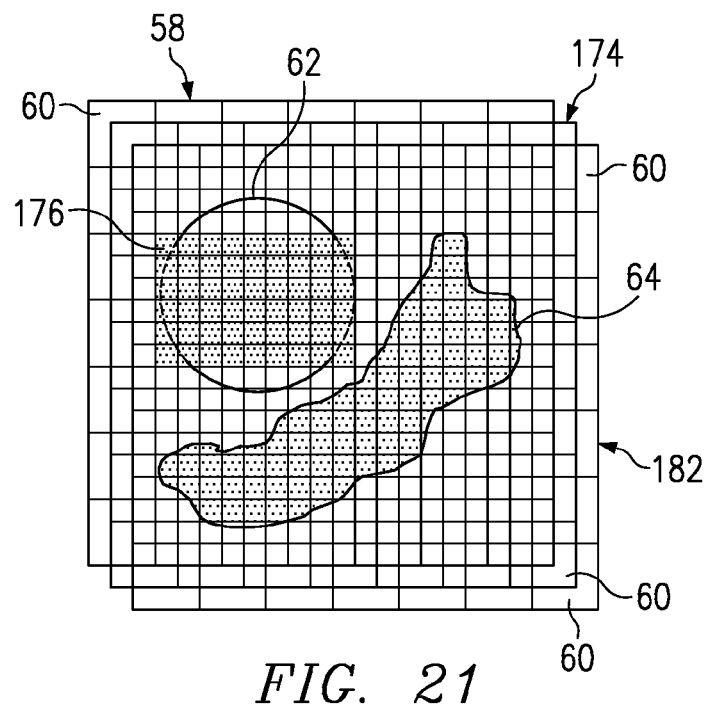
FIGS. 21-23 are each an image as seen from the CCD in the device of FIG. 20.
Figure 22:
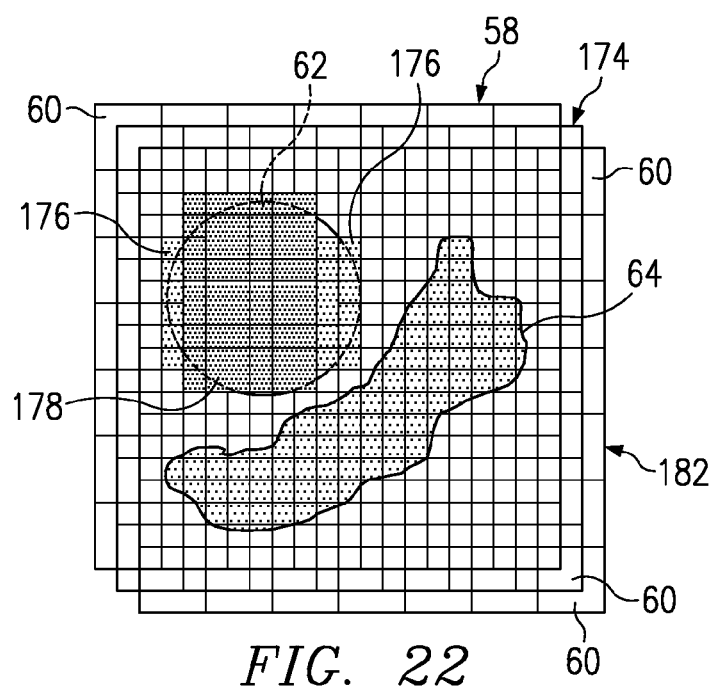
Figure 23:
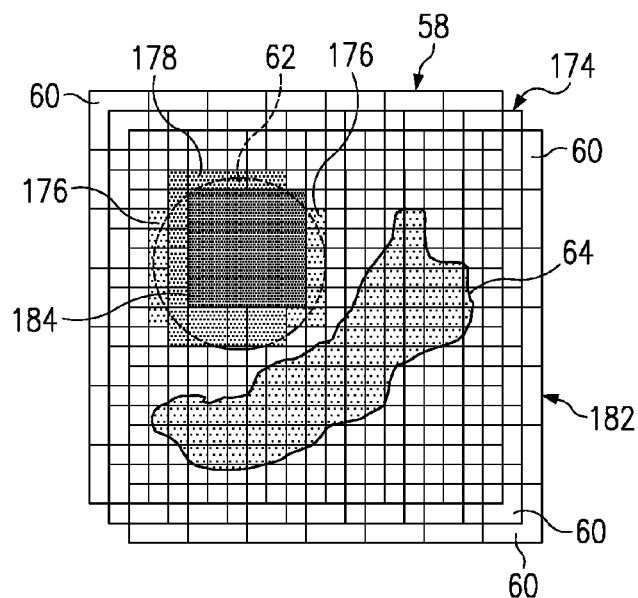

FIG. 20 shows a device 40 in accordance with a third embodiment of the present invention, in which the device 40 uses three DMDs 50, 170, 180 and one CCD 52. The second DMD 170 is shifted relative to the first DMD 50, and the third DMD 180 is shifted relative to the second DMD 170. Thus, the resolution may be further enhanced by adding the third DMD 180. FIGS. 21-23 illustrate the faces 58, 174, 182 of the three DMD elements 50, 170, 180, respectively, of FIG. 20 superimposed upon each other, as aligned by the image rays and as seen from the CCD. Although not shown, other embodiments may have four, five, or more DMDs to still further increase the resolution. However, at some point the expense of multiple DMDs and/or the increase in complexity of the device 40 versus the benefit, will likely create a practical limit to the number of desired DMDs to be used in a device 40.

Figure 24:
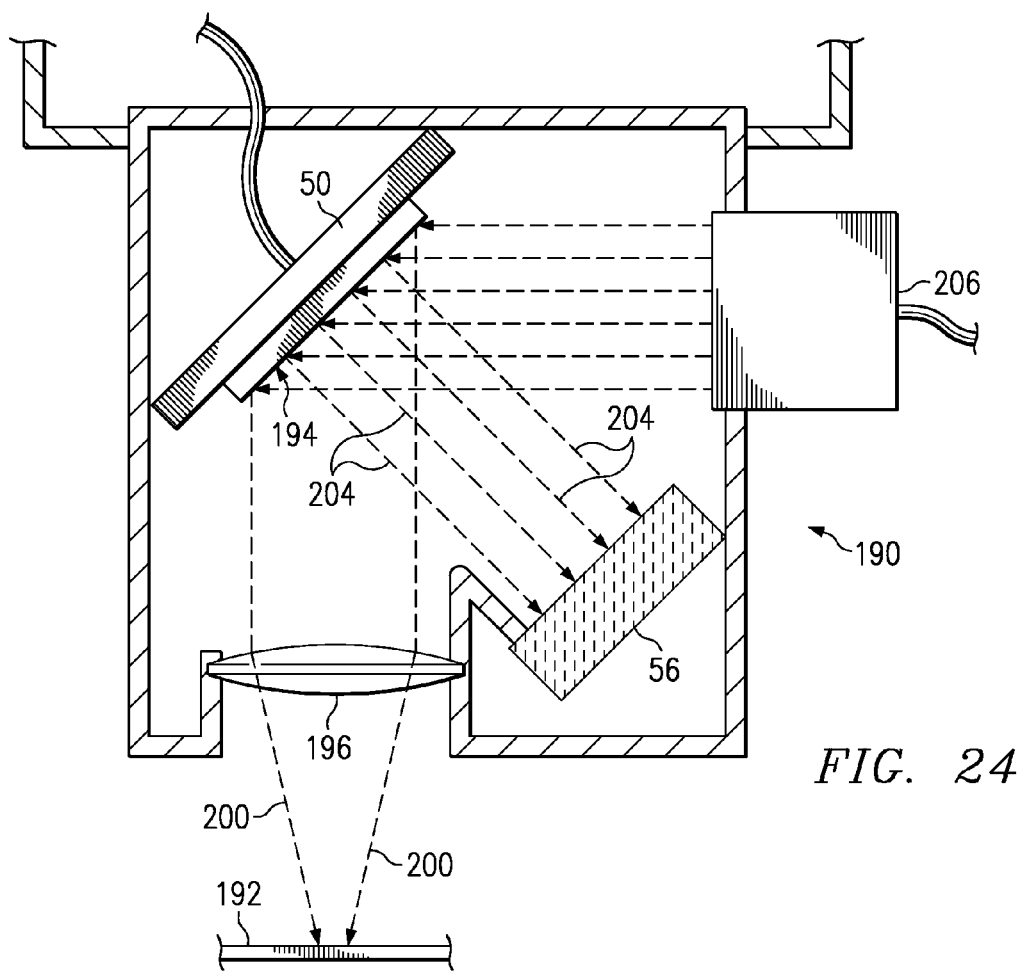
FIG. 24 is a schematic showing a photolithography device in accordance with a fourth embodiment of the present invention.
Figure 25:
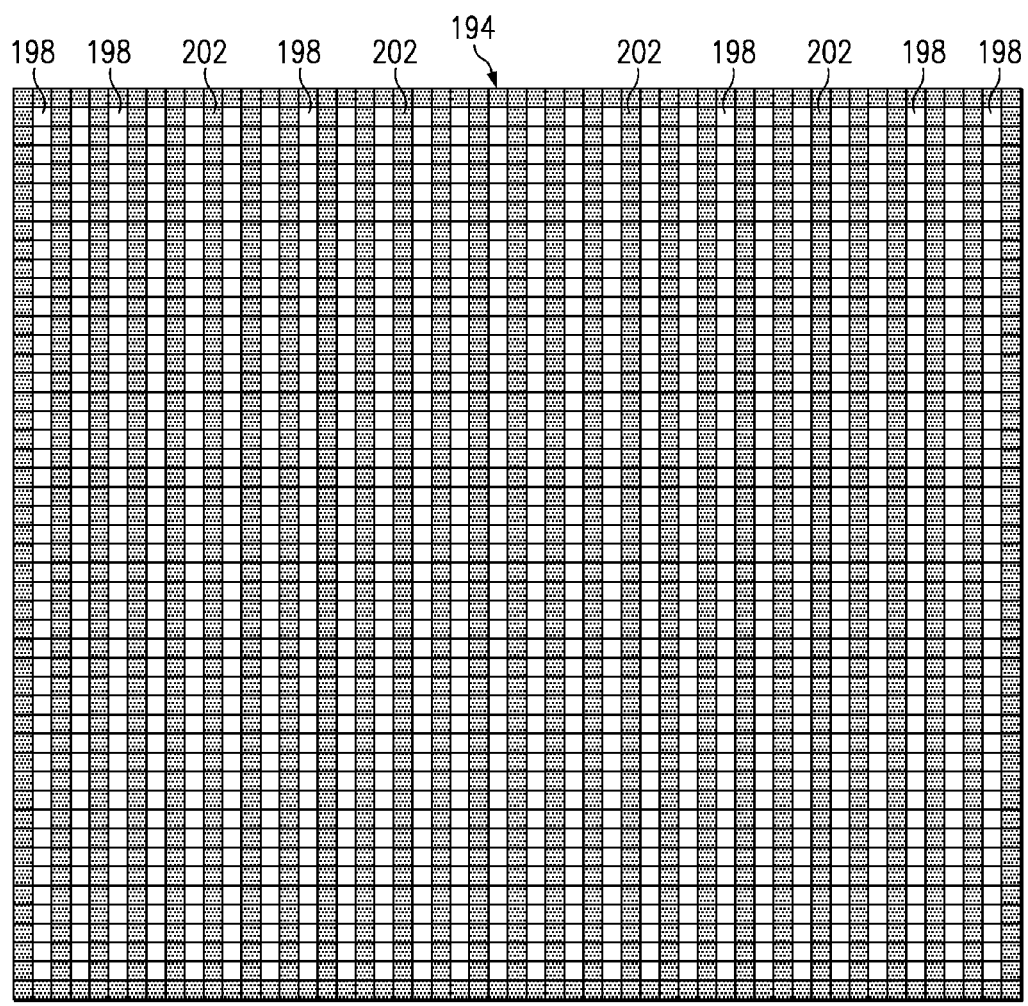
FIG. 25 is an enlarged view of an image as seen on the DMD from the CCD of FIG. 24.

The present invention also may be incorporated in other embodiments for use in a variety of other ways outside the field of astronomy. For example, FIG. 24 shows a fourth embodiment of the present invention. The fourth embodiment is a programmable active masking system 190 for use in photolithography processes in semiconductor manufacturing. Thus the mask for selectively exposing photo-reactive material on a wafer 192 may be provided by a DMD 50 of the system 190. FIG. 25 shows the face 194 of the DMD 50 of FIG. 24 as seen from the lens 196. A first group of mirror elements 198 (unshaded squares in FIG. 25) on the face 194 of the DMD 50 in FIG. 25 are in a first position to reflect a first group of light rays 200 from the DMD 50 to the lens 196, and then onto the wafer 192. A second group of mirror elements 202 are tilted to a second position to reflect a second group of light rays 204 from the DMD 50 to a light absorbing portion 56. Hence, part of the light 200 from the light source 206 may be reflected onto the wafer 192 in a pattern (see FIG. 25) provided by the first group of mirror elements 198 positioned in the first position on the DMD 50. Thus, only the pattern formed by the first group of mirror elements 198 (see FIG. 25) shines through the focusing lens 206 onto the wafer to expose the photo-reactive material with the pattern, as desired.

An advantage of the fourth embodiment is that the mask can be actively controlled to vary the pattern as needed or as desired because the mirror elements on the DMD 50 may be individually and independently controlled to form a wide variety of masking patterns. Therefore, the same system 190 with the same DMD 50 may be used to form numerous different patterns on the wafer 192 for numerous steps during the formation of a semiconductor device. Also, as illustrated above regarding the astronomy examples of FIGS. 1-23, the exposure time may vary for different parts of the mask while the wafer is being exposed. Thus, unlike conventional static masks often used in semiconductor processing, masking with one or more DMD devices provides a way to actively and/or programmably vary the pattern during the exposure of the wafer 192. Such variations may allow for better control of the shapes of sidewalls for deep etching procedures, for example.

In any embodiment of the present invention, one or more lenses may be place within the path of the image light rays before and/or after any of the SLM devices used. Although only Furthermore, other embodiments of the present invention may be incorporated into any device or system for capturing images where it may be useful to controllably mask part of the image, including but not limited to: still cameras using film; digital still cameras; movie cameras using film; digital video recorders, camcorders, or cameras; medical devices using optical imaging (digital or film based), such as microscopes, endoscopes, and fiber-optic video cameras; and industrial devices using optical imaging (digital or film based), such as welding, nondestructive testing, visual inspections, downhole petroleum operations, and other field operations.

It will be appreciated by those skilled in the art having the benefit of this disclosure that an embodiment of the present invention provides a way to expose different parts of a single field of view for various and differing lengths of time. It should be understood that the drawings and detailed description herein are to be regarded in an illustrative rather than a restrictive manner, and are not intended to limit the invention to the particular forms and examples disclosed. On the contrary, the invention includes any further modifications, changes, rearrangements, substitutions, alternatives, design choices, and embodiments apparent to those of ordinary skill in the art, without departing from the spirit and scope of this invention, as defined by the following claims. Therefore, it is intended that the following claims be interpreted to embrace all such further modifications, changes, rearrangements, substitutions, alternatives, design choices, and embodiments.

The invention claimed is:

1. A device for masking one or more selected areas of a field of view while capturing an image, comprising:
   an image aperture formed in the device;
   a first spatial light modulator (SLM) comprising an array of movable reflective elements, the first SLM being positioned at a first angle with respect to a central axis of image light rays entering the device through the image aperture, and the first SLM positioned such that the image light rays will strike at least some of the reflective elements on the first SLM;
   a second SLM comprising an array of movable reflective elements, the second SLM being positioned apart from the first SLM such that, when at least some of the first SLM reflective elements are in a first position, at least some of the image light rays reflected from the first SLM reflective elements positioned in the first position of the first SLM will strike at least part of the second SLM; and
   an image capturing device for use in recording an image, the image capturing device being located in a position such that, when at least some of the second SLM reflective elements are in a first position, at least some of the image light rays reflected from the second SLM reflective elements positioned in the first position of the second SLM will eventually strike at least part of the image capturing device.

2. The device of claim 1, wherein at least the first or the second SLM comprises a digital micro-mirror device.

3. The device of claim 1, wherein at least the first or the second SLM comprises an anti-reflective membrane device.

4. The device of claim 1, wherein at least the first or the second SLM comprises a deformable film modulator device.

5. The device of claim 1, wherein the image capturing device comprises a digital light sensor.

6. The device of claim 1, wherein the image capturing device comprises a charge-coupled device.

7. The device of claim 1, wherein the image capturing device comprises photographic film.

8. The device of claim 1, wherein the image capturing device comprises a photo-reactive material that is formed on a semiconductor wafer.

9. The device of claim 1, further comprising:
   a lens located in the image aperture.

10. The device of claim 1, further comprising:
    a lens located within an image reflection path between the second SLM and the image capturing device.

11. The device of claim 1, wherein the device is a camera.

12. The device of claim 1, wherein the device is part of a video camera.

13. The device of claim 1, wherein the device is adapted to be optically coupled to a telescope.

14. The device of claim 1 wherein the second SLM is shifted relative to the first SLM so that image rays reflected from a given position of a movable element of the first SLM will strike a location at a differing position of a respective movable element of the second SLM.

15. The device of claim 14 wherein the differing position is one-half a distance of a dimension of each movable element of the first SLM.

16. The device of claim 1:
    wherein the device comprises a plurality of SLMs;
    wherein the plurality of SLMs includes the second SLM; and
    wherein each SLM in the plurality of SLMs comprises a respective array of movable reflective elements and is positioned apart from another SLM in the plurality of SLMs such that, when at least some of the reflective elements of a given SLM in the plurality of SLMs are in a first position, at least some of the image light rays reflected from the given SLM reflective elements will strike either at least part of another SLM in the plurality of SLMs or at least part of the image capturing device.

17. A device for masking one or more selected areas of a field of view while capturing an image, comprising:
    an image aperture formed in the device;
    a first digital micro-mirror device (DMD) comprising an array of movable mirror elements, the first DMD being positioned at a first angle with respect to a central axis of image light rays entering the device through the image aperture, and the first DMD being positioned such that the image light rays will strike at least some of the mirror elements on the first DMD;
    a second DMD comprising an array of movable mirror elements, the second DMD being positioned apart from the first DMD such that, when at least some of the first DMD mirror elements are in a first position, at least some of the image light rays reflected from the first DMD mirror elements positioned in the first position of the first DMD will strike at least part of the second DMD; and
    a charge-coupled device (CCD) comprising an array of photon sensing elements, the CCD being located in a position so that, when at least some of the second DMD mirror elements are in a first position, at least some of the image light rays reflected from the second DMD mirror elements positioned in the second DMD first position will eventually strike at least some of the CCD elements.

18. The device of claim 17, further comprising:
a shutter adapted to block the image light rays from striking the first DMD when the shutter is closed and to allow at least some of the image light rays to strike the first DMD when the shutter is open.

19. The device of claim 17, further comprising:
a controller electrically coupled to the first DMD and the second DMD, the controller being adapted to selectively send signals to the first DMD and the second DMD for causing one or more movable of the mirror elements in a respective DMD to be actuated.

20. The device of claim 17, further comprising:
an electrical circuitry electrically coupled to the first DMD and the second DMD and the CCD.

21. The device of claim 17 wherein the second DMD is shifted relative to the first DMD so that image rays reflected from a given position of a movable mirror element of the first DMD will strike a location at a differing position of a respective movable mirror element of the second DMD.

22. The device of claim 21 wherein the differing position is one-half a distance of a dimension of each movable mirror element of the first DMD.

23. The device of claim 17:
wherein the device comprises a plurality of DMDs;
wherein the plurality of DMDs includes the second DMD; and
wherein each DMD in the plurality of DMDs comprises a respective array of movable mirror elements and is positioned apart from another DMD in the plurality of DMDs such that, when at least some of the movable mirror elements of a given DMD in the plurality of DMDs are in a first position, at least some of the image light rays reflected from the given DMD mirror elements will strike either at least part of another DMD in the plurality of DMDs or at least part of the image capturing device.

24. A device for masking one or more selected areas of a field of view while capturing an image, comprising:
an image aperture formed in the device;
a first digital micro-mirror device (DMD) comprising a first array of electrically controllable and movable mirror elements, the first DMD being positioned at a first angle with respect to a central axis of image light rays entering the device through the image aperture, and the first DMD being positioned such that the image light rays will strike at least some of the mirror elements on the first DMD;
a second DMD comprising a second array of electrically controllable and movable mirror elements, the second DMD being positioned at a first spaced distance from the first DMD, the second array of mirror elements facing in an opposite direction than the first array of mirror elements, and the second DMD being positioned so that, when at least some of the first DMD mirror elements are in a first position, at least some of the image light rays reflected from the first DMD mirror elements positioned in the first position will strike at least some of the second DMD mirror elements; and a charge-coupled device (CCD) comprising an array of photon sensing elements, the CCD being located in a position so that, when at least some of the second DMD mirror elements are in a first position, at least some of the image light rays reflected from the second DMD mirror elements positioned in the first position will eventually strike at least some of the CCD elements.

25. The device of claim 24, wherein the second DMD position is offset relative to the first DMD position such that image light rays reflecting from the center of at least some of the first DMD mirrors at the first position strike a location on the second DMD where two or more second DMD mirror elements meet.

26. The device of claim 24, wherein the second DMD position is offset relative to the first DMD position such that image light rays reflecting from the center of at least some of the first DMD mirrors at the first position strike a location on the second DMD where two or more second DMD mirror elements meet.

27. The device of claim 24, wherein the second DMD is substantially parallel to the first DMD.

28. The device of claim 24, further comprising:
a third DMD comprising a third array of electrically controllable and movable mirror elements, the third DMD being positioned at a second spaced distance from the second DMD, the third DMD being substantially parallel to the second DMD, the third array of mirror elements facing in an opposite direction than the second array of mirror elements, and the third DMD being positioned so that, when at least some of the second DMD mirror elements are in a first position, at least some of the image light rays reflected from the second DMD mirror elements positioned in the first position will strike at least some of the third DMD mirror elements; and
the CCD also being located in a position so that, when at least some of the third DMD mirror elements are in a first position, at least some of the image light rays reflected from the third DMD mirror elements positioned in the first position will eventually strike at least some of the CCD elements.

29. The device of claim 28, further comprising:
a fourth DMD comprising a fourth array of electrically controllable and movable mirror elements, the fourth DMD being positioned at a third spaced distance from the third DMD, the fourth DMD being substantially parallel to the third DMD, the fourth array of mirror elements facing in an opposite direction than the third array of mirror elements, and the fourth DMD being positioned so that, when at least some of the third DMD mirror elements are in a first position, at least some of the image light rays reflected from the third DMD mirror elements positioned in the first position will strike at least some of the fourth DMD mirror elements; and
the CCD also being located in a position so that, when at least some of the fourth DMD mirror elements are in a first position, at least some of the image light rays reflected from the fourth DMD mirror elements positioned in the first position will strike at least some of the CCD elements.

* * * * *